US012691587B2

(12) United States Patent
Lermond et al.

(10) Patent No.: US 12,691,587 B2
(45) Date of Patent: Jul. 28, 2026

(54) AUTOMATIC LABELING SYSTEM

(71) Applicant: SATO HOLDINGS KABUSHIKI KAISHA, Tokyo (JP)

(72) Inventors: Kevin Lermond, Charlotte, NC (US); Jiro Miura, Tokyo (JP); Hiroaki Horigome, Tokyo (JP); Peter Fullerton, Charlotte, NC (US)

(73) Assignee: SATO CORPORATION, Tokyo (JP)

( * ) Notice: Subject to any disclaimer, the term of this patent is extended or adjusted under 35 U.S.C. 154(b) by 43 days.

(21) Appl. No.: 18/725,584

(22) PCT Filed: Jan. 5, 2023

(86) PCT No.: PCT/US2023/010243
§ 371 (c)(1),
(2) Date: Jun. 28, 2024

(87) PCT Pub. No.: WO2023/133226
PCT Pub. Date: Jul. 13, 2023

(65) Prior Publication Data
US 2025/0091216 A1      Mar. 20, 2025

Related U.S. Application Data

(60) Provisional application No. 63/297,336, filed on Jan. 7, 2022.

(51) Int. Cl.
B25J 9/16          (2006.01)
B65C 1/02          (2006.01)
(Continued)

(52) U.S. Cl.
CPC ............... B25J 9/1697 (2013.01); B65C 1/02 (2013.01); G06T 7/70 (2017.01); G06V 10/993 (2022.01); G06T 2200/24 (2013.01)

(58) Field of Classification Search
None
See application file for complete search history.

(56) References Cited

U.S. PATENT DOCUMENTS 9,969,519 B2 *    5/2018   Putzer ...................... B65C 9/40
11,078,028 B1 *   8/2021   Groves .................. B65G 27/02
(Continued)

FOREIGN PATENT DOCUMENTS

WO      WO-2016/091921 A1      6/2016
WO      WO-2020/115126 A1      6/2020

OTHER PUBLICATIONS

Extended European Search Report issued in corresponding EP Patent Application No. 23737600.9, dated Dec. 8, 2025 (9 pages).

*Primary Examiner* — Ryan Rink
(74) *Attorney, Agent, or Firm* — Foley & Lardner LLP

(57)          ABSTRACT

Systems for automatic labeling and methods for using automatic labeling systems are disclosed. A system can include a camera, and a controller including one or more processors coupled to one or more memories. The system can acquire an image of a sample object via the camera, and identify first and second tokens depicted in the image or positioned over the image of the sample object. The system can designate a location of the first token as a target label location at which a label is to be applied to the sample object, and designate a location of the second token as an identifying information location that is identifiable to determine an orientation of the sample object.

24 Claims, 7 Drawing Sheets

(51) Int. Cl.
    *G06T 7/70*         (2017.01)
    *G06V 10/98*      (2022.01)

(56)            References Cited

U.S. PATENT DOCUMENTS

| | | | |
|---|---|---|---|
| 11,352,161 B2 * | 6/2022 | Fan | B65C 9/02 |
| 2001/0054470 A1 * | 12/2001 | Firehammer | B65C 1/025 |
| | | | 156/64 |
| 2004/0258313 A1 | 12/2004 | Jones et al. | |
| 2013/0342623 A1 * | 12/2013 | Boot | B41J 3/46 |
| | | | 347/110 |
| 2014/0291114 A1 * | 10/2014 | Artz | B65G 47/244 |
| | | | 198/369.6 |
| 2015/0120057 A1 | 4/2015 | Wong et al. | |
| 2017/0225819 A1 * | 8/2017 | Hirata | B65C 3/06 |
| 2018/0265239 A1 | 9/2018 | Riva | |
| 2019/0362486 A1 * | 11/2019 | Diao | G06T 7/0004 |
| 2021/0280091 A1 | 9/2021 | Simpson | |
| 2021/0397819 A1 * | 12/2021 | Park | G06V 40/161 |
| 2022/0024628 A1 * | 1/2022 | Solanki | B65C 9/44 |
| 2022/0097889 A1 * | 3/2022 | Wen | B65C 9/26 |
| 2023/0045251 A1 * | 2/2023 | Schmoker | B65C 9/46 |
| 2023/0050326 A1 * | 2/2023 | Lei | B65C 9/36 |

\* cited by examiner

400

405 — ACQUIRE AN IMAGE OF A SAMPLE OBJECT

410 — IDENTIFY FIRST AND SECOND TOKENS DEPICTED IN OR POSITIONED OVER THE IMAGE

415 — DESIGNATE A LOCATION OF THE FIRST TOKEN AS A TARGET LABEL LOCATION

420 — DESIGNATE A LOCATION OF THE SECOND TOKEN AS AN IDENTIFYING INFORMATION LOCATION

AUTOMATIC LABELING SYSTEM

CROSS-REFERENCE TO RELATED PATENT APPLICATIONS

This application claims the benefit of U.S. Provisional Application No. 63/297,336, filed Jan. 7, 2022, the contents of which are incorporated herein by reference in their entirety and for all purposes.

FIELD OF THE DISCLOSURE

This application is directed to an automatic labeling system and associated methods, software, and techniques.

BACKGROUND

Conventional labeling systems require a considerable amount of manual labor to manually measure the dimensions and shape of an object to be labelled, and the location where a label should be placed. These challenges are compounded when dealing with different items in small batches that require labeling in a relatively short time period, such as a labeling for some retail environments.

SUMMARY

The systems and methods described herein provide techniques to train a controller to recognize the orientation and labeling locations for objects using a sample object as a reference. Tokens placed on the sample object or on an image of the sample object designate regions on the object that correspond to a label location and a location on the sample object that has an identifying feature, such as text, a logo, or other visual indicators. During labeling, a controller captures images of each object on a conveyor or other transport mechanism, and automatically detects the location and orientation of the object. A location to place the label on the detected object can be determined based on the information generated using the sample object. A robotic arm can automatically grab and position the label on the object as it moves on the conveyor.

According to one embodiment of the present disclosure, a system for automatic labeling comprises a camera; and a controller comprising one or more processors coupled to one or more memories. The controller is configured to acquire an image of a sample object via the camera; identify first and second tokens depicted in the image or positioned over the image of the sample object; designate a location of the first token as a target label location at which a label is to be applied to the sample object; and designate a location of the second token as an identifying information location that is identifiable to determine an orientation of the sample object.

In some implementations, the first and second tokens are physical tokens positioned over respective portions of the sample object in the image. In some implementations, the first and second tokens are virtual tokens positioned over the image via input to a graphical user interface. In some implementations, the target label location is stored as a location that is relative to the location of the identifying information location or a border of the sample object. In some implementations, the first and second tokens are identified in the image based on a respective predetermined pattern on the first and second tokens.

In some implementations, the system can acquire a second image of the sample object without the first and second tokens, and determine a suitability score for recognition of the sample object based on the image and the second image. In some implementations, the system can include a robotic arm configured to apply labels to objects. In some implementations, the system can detect a location and an orientation of an object in a stream of objects based on the identifying information location, and cause the robotic arm to apply a label to the object based on the detected location and orientation and the target label location.

In some implementations, the system can cause the robotic arm to move in a horizontal direction based on the detected location and orientation and the target label location, and subsequently cause the robotic arm to move in a vertical direction based on the detected location and orientation and the target label location to apply the label to the object. In some implementations, the system can reject a second object of the stream of objects based on an orientation of the second object. In some implementations, the system can verify the label was correctly applied to the object.

In some implementations, the system can include a plate configured to receive printed labels from a printer. In some implementations, the system can cause the robotic arm to retrieve the label from the plate prior to applying the label to the object.

In some implementations, the system can determine one or more dimensions of the sample object, and control the robotic arm to avoid a collision with the object based on the one or more dimensions of the sample object. In some implementations, the one or more dimensions comprise a height of the sample object. In some implementations, the one or more dimensions comprise a length and/or a width of the sample object. In some implementations, the system can adjust a speed of a conveyor transporting the object based on the length and/or the width of the sample object. In some implementations, the camera is a three-dimensional (3D) camera. In some implementations, the system can generate a code for the sample object.

According to another embodiment of the present disclosure, a method of using an automatic labeling system comprises acquiring an image of a sample object; identifying first and second tokens depicted in the image or positioned over the image of the sample object; designating a location of the first token as a target label location at which a label is to be applied to the sample object; and designating a location of the second token as an identifying information location that is identifiable to determine an orientation of the sample object.

According to yet another embodiment of the present disclosure, a system for automatic labeling comprises a camera and a controller comprising one or more processors coupled to one or more memories. The controller is configured to acquire an image of a sample object via the camera; identify a token depicted in the image or positioned over the image of the sample object; designate a location of the token as a target label location at which a label is to be applied to the sample object.

In some implementations, the token is a physical token positioned over a portion of the sample object in the image. In some implementations, the token is a virtual token positioned over the image via input to a graphical user interface. In some implementations, the target label location is stored as a location that is relative to a corner of the sample object. In some implementations, the token is identified in the image based on a respective predetermined pattern on the token. In some implementations, the system can acquire a second image of the sample object without the token, and determine a suitability score for recognition of the sample object based on the image and the second image.

In some implementations, the system can include a robotic arm configured to apply labels to objects. In some implementations, the system can detect a location and an orientation of an object in a stream of objects, and cause the robotic arm to apply a label to the object based on the detected location and orientation and the target label location. In some implementations, the system can cause the robotic arm to move in a horizontal direction based on based on the detected location and orientation and the target label location, and subsequently cause the robotic arm to move in a vertical direction based on the detected location and orientation and the target label location to apply the label to the object.

In some implementations, the system can reject a second object of the stream of objects based on an orientation of the second object. In some implementations, the system can verify the label was correctly applied to the object. In some implementations, the system can include a plate configured to receive printed labels from a printer. In some implementations, the system can cause the robotic arm to retrieve the label from the plate prior to applying the label to the object.

In some implementations, the system can determine one or more dimensions of the sample object; and navigate the robotic arm to avoid a collision with the object based on the one or more dimensions of the sample object. In some implementations, the one or more dimensions comprise a height of the sample object. In some implementations, the system can navigate the robotic arm vertically based on the height of the sample object.

In some implementations, the one or more dimensions comprise a length or a width of the sample object. In some implementations, the system can adjust a speed of a conveyor transporting the object based on the length or the width of the sample object. In some implementations, the camera is a 3D camera. In some implementations, the system can generate a code for the sample object.

According to yet another embodiment of the present disclosure, a method of using an automatic labeling system comprises acquiring an image of a sample object; identifying a token depicted in the image or positioned over the image of the sample object; and designating a location of the token as a target label location at which a label is to be applied to the sample object.

In one embodiment, objects are placed on the layup conveyor, which moves relatively slowly. Objects do not have to be placed on the layup conveyor in a predetermined orientation because the camera and imaging software recognizes the orientation. The labeling conveyor moves more quickly to separate items so that there is sufficient space between items for recognition and labeling. One suitable type of camera is a 3D camera made by OMRON; however many other types of imaging systems may be used. The exit conveyor is used to direct an object to an appropriate destination, depending on whether a label has been correctly placed. Correct placement may be determined by an additional camera (not shown) which uses image recognition to determine whether a label has been properly placed (for example, correct position and orientation). The label can be any type of label (for example, with text and/or an RFID tag). The teaching process described below can use the camera shown above or another camera in a remote location. Suitable robots and associated software is available from Yaskawa of Japan and the United States. However, many different types of robots and software may be used to practice the invention. The speeds of each of the conveyors may be controlled individually and such speeds may be constant or may vary.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular forms of 'a,' 'an,' and 'the' include plural referents unless the context clearly dictates otherwise.

DETAILED DESCRIPTION

Figure 1A:
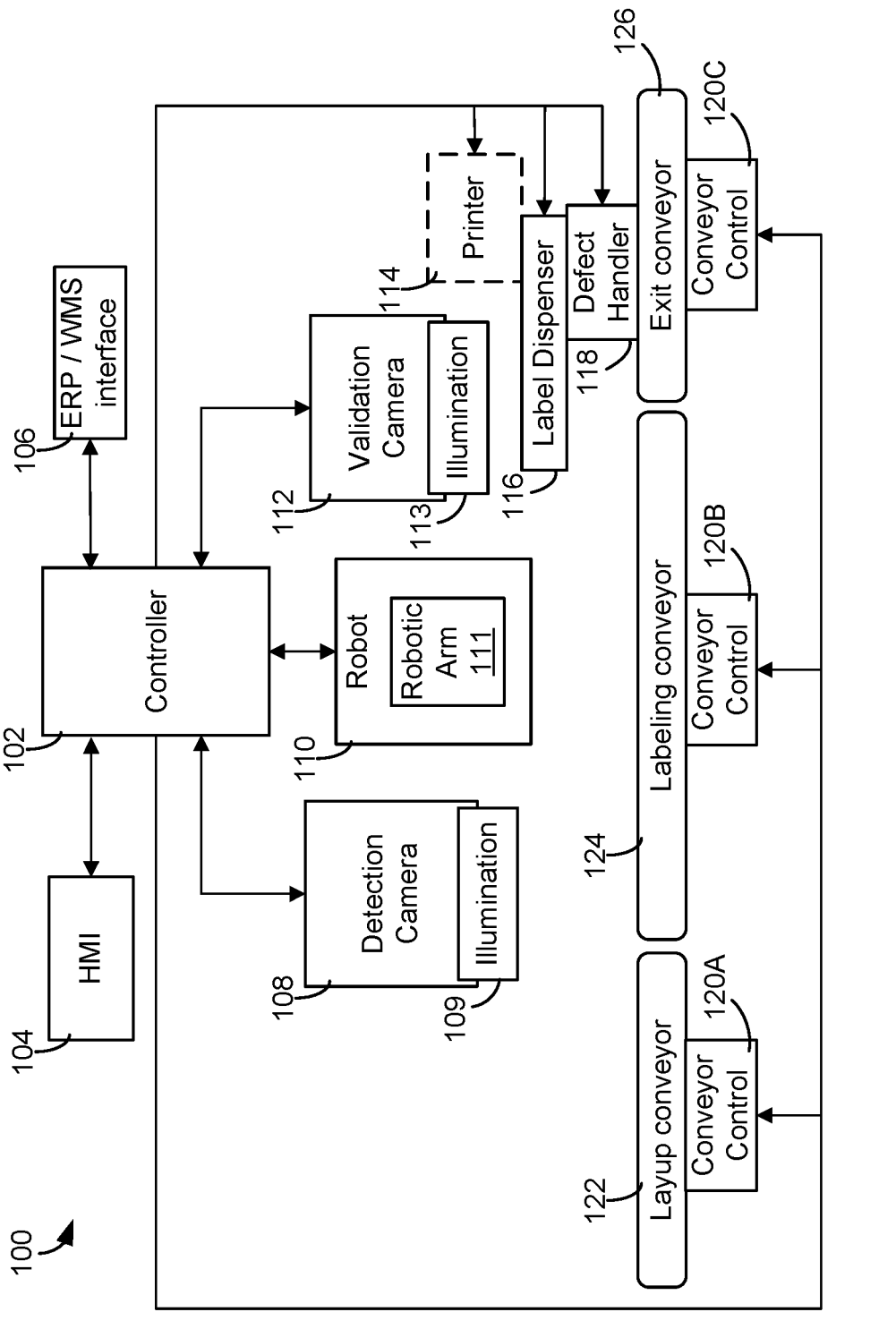
FIG. 1A is a block diagram of an example system for automatic labeling, in accordance with one or more implementations.

Below are detailed descriptions of various concepts related to and implementations of techniques, approaches, methods, apparatuses, and systems for automatic labeling. The various concepts introduced above and discussed in detail below may be implemented in any of numerous ways, as the described concepts are not limited to any particular manner of implementation. Examples of specific implementations and applications are provided primarily for illustrative purposes.

The systems and methods described herein provide techniques for automatic labeling, including techniques for quickly teaching and determining object suitability and qualifications for labeling. Using the techniques described herein, a controller can be "taught" to automatically recognize an object at the input, and apply a printed label to the object at a predetermined position and orientation, while the object is moving on a conveyor, using a labeling robot. The applied label and barcode data can be verified. If they are acceptable, the object continues downstream to the exit. Based on predetermined handling rules, an incorrectly or correctly labeled object can be handled differently downstream.

The simplified setup of the system to recognize the position and orientation of an object and determine the label position on the object is suitable for small product runs and many different product types. In some embodiments, different types of products can be run at the same time, and the system can also recognize the type of product and apply a label with product information for that product. In some embodiments, different labels for different products can be pre-printed and available to be applied to an object after the product type of the object is recognized. In other embodiments, a label can be printed on demand after the object is recognized. Storage and recall of these setups creates flexibility in defining the labeling data for an object at one system, and later reliably retrieving the labelling information when ready to label via any linked system (e.g., via network or data repository). The labeling data for an object (sometimes referred to herein as "labeling parameters") can include or indicate a location and orientation at which a label is to be applied to the object.

The labeling data for an object can be generated using physical or virtual tokens that designate areas for labels or areas on the object having identifying features or characteristics. The labelling data for any number of objects can be stored and easily retrieved or shared, which simplifies the setup process for future labelling processes (e.g., product runs). A variety of methods to define the labeling data for an object allows flexibility across a wide range of products. The object detection and recognition techniques may be altered as needed to accommodate different object characteristics, such as object size or reflectance.

Additionally, the system can automatically vary the speed of conveyor transporting objects during labeling based on product sizes. This ensures object separation, successful continuous object labeling, and improved throughput. In some implementations redundant system components, such as multiple printers and multiple quick-teach methods, enable labeling for a wider variety of objects by expanding the variety of labels that can be selected.

The systems and methods described herein can be utilized to label a wide variety of objects (e.g., products) with small product runs. Unlike conventional labeling systems, which require significant and complicated manual setup of object information, the systems and methods described herein can automatically generate information that is used to recognize the orientation and position of objects for labeling. The techniques described herein can be utilized to automatically generate labeling parameters (e.g., label location, object size, and object-identifying information) using a sample object. The labeling parameters can then be transmitted to and implemented by a robot responsible for labeling objects, without manual and extensive measuring and recording of the object parameters. In some implementations, a controller of the robot can generate the labeling parameters for the sample object.

When implemented by the labeling system for labeling, the generated labeling parameters for an object can be analyzed to inform and adjust the operational variables of the labeling system without operator intervention. The labeling parameters can be retrieved using an identifier of the object that is to be labeled. The identifier of the object may be scanned (e.g., as a barcode or quick-response (QR) code) by the system, or provided via user input to a user interface. Automatically adjusting the operational characteristics of the system, such as robot position or movement while labeling, allows the system to operate with variety of objects while adjusting as necessary for different object types, sizes, and characteristics.

The techniques described herein can be useful for labeling individual products at a distribution center. In such environments, the order of products is received at the distribution center. Each product will be labeled with the retailers' specific label. The labels are unique for the product because they may include the retailer's brand logo, identifier code, or other descriptive details in addition to a price. The techniques described herein can be used to apply any type of label to a product. Conventionally, previously printed labels are applied to each item in the order manually by an employee, which is slow and introduces the possibility of human error.

To address these issues, the systems described herein can print the labels for products as needed, which are then automatically applied directly to the product. Because the system relies on labeling parameters that are generated based on a sampling object, the printed labels are applied consistently to the same location on each product uniformly and quickly, which improves the efficiency of the labeling process while improving label placement and reliability.

FIG. 1A is a block diagram of an example system 100 for automatic labeling, in accordance with one or more implementations. The system 100 can be utilized to generate labeling parameters for one or more objects, and for automatically applying labels to objects in a stream of objects based on pre-generated labeling parameters for those objects. In brief overview, the system 100 can include a controller 102, a human-machine interface (HMI) 104, and an enterprise resource planning (ERP)/warehouse management system (WMS) interface. The system 100 can include a detection camera 108, which may be equipped with or utilize an illumination device 109. The system 100 can include a robot 110, which can be utilized to apply labels to objects.

Objects can be introduced to the system 100 via the layup conveyor 122, which leads to the labeling conveyor 124 and the exit conveyor 118. Each of the layup conveyor 122, the labeling conveyor 124, and the exit conveyor 118, can be controlled by the conveyor controls 120A, 120B, and 120C, respectively. The system 100 can include the validation camera 112, which may be equipped with or utilize an illumination device 113. In some embodiments, the system 100 can optionally include a printer 114, which may be utilized to print labels for objects that are to be labeled by the components of the system 100. The system 100 can include a label dispenser 116, which can transport labels from the printer to be retrieved by the robot 110. The system 100 can include the defect handler 118, which can handle situations where labels not applied to objects or incorrectly applied to objects that have traversed the labeling conveyor 124.

In further detail of components of the system 100, the controller 102 can include at least one processor and a memory (e.g., a processing circuit). The memory can store processor-executable instructions that, when executed by a processor, cause the processor to perform one or more of the operations described herein. The processor may include a microprocessor, a microcontroller, an application-specific integrated circuit (ASIC), a field-programmable gate array (FPGA), a graphics-processing unit (GPU), combinations thereof, or the like. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The controller 102 may include or may be implemented using one or more computing devices or servers that can perform various functions as described herein. The controller 102 can include any or all of the components and perform any or all of the functions of the computer system 500 described herein in conjunction with FIGS. 1A-1D.

The controller 102 may be in communication with the HMI 104, for example, via a network or via a suitable communication interface or bus. The HMI 104 can be any combination of input devices, output devices, or computing devices that can receive user input to coordinate the functionality of the controller 102. In some implementations, one or more computing operations described herein as being performed by the controller 102 may instead be performed by the HMI 104, or by a combination of the controller 102 and the HMI 104. The HMI 104 may be utilized to control various parameters of the components of the system 100 via the controller 102, as described herein.

The HMI 104 can include at least one processor and a memory (e.g., a processing circuit). The memory can store processor-executable instructions that, when executed by the processor, cause the processor to perform one or more of the operations described herein. The processor can include a microprocessor, an ASIC, an FPGA, a GPU, combinations thereof, or the like. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The HMI 104 can include any or all of the components and perform any or all of the functions of the computer system 500 described herein in conjunction with FIG. 5.

The HMI 104 may be or include a personal computer, a laptop computer, or a user interface (e.g., combination of input and output devices) for the controller 102. The HMI 104 can be implemented using hardware or a combination of software and hardware. The HMI 104 can include a display, which may present one or more graphical user interfaces relating to the generation of labeling parameters (e.g., the teaching process) or automatic labeling of objects, as described herein. The display can include a monitor, display panel, a touch screen, or another type of interactive display. The HMI 104 can include one or more input/output devices (e.g., a mouse, a keyboard, digital keypad, optical scanner, audio input, voice recognition, etc.).

The HMI 104 may communicate user interactions to the controller 102 to coordinate the functionality of the controller 102 according to the processes described herein. The HMI 104 may present information received or requested from the controller 102. The HMI 104 may present information received or requested from other components of the system 100 via the controller 102. For example, the HMI 104 may present one or more graphical user interfaces, such as the graphical user interfaces described in connection with FIGS. 3A and 3B, among other user interfaces, user interface elements, or graphical indicators or data described herein.

In some implementations, the HMI 104 or the controller 102 may include or may be communicatively coupled to any number of components that facilitate processes to generate labeling parameters based on one or more sample objects. For example, the HMI 104 or the controller 102 may be coupled to one or more cameras, which may be or may be similar to the detection camera 108. The cameras may be utilized to capture images with or without physical tokens positioned thereon, as described in further detail herein. The HMI 104 or the controller 102 may include one or more graphical displays that can display images of sample objects captured by the cameras (e.g., with or without physical tokens). The graphical display(s) of the HMI 104 or the controller 102 may display one or more graphical user interface elements that enable a user to position one or more virtual tokens over a displayed image of a sample object, as described herein.

The ERP/WMS interface 106 can be any type of communications interface, such as a network connection or communications interface, that enables the controller 102 (or the HMI 104) to communicate with one or more external computing systems (not pictured). For example, the external computing systems may be remote servers, computing systems, or data repositories that store, maintain, or manage data corresponding to a warehouse, object or product inventory, or other types of data. The ERP/WMS interface 106 can enable the controller 106 to retrieve information related to one or more products that are detected or otherwise configured for labeling by the system 100. The ERP/WMS interface 106 may provide or may otherwise be used to retrieve data from identified objects (e.g., identified by scanning a barcode, QR code, or otherwise providing an identifier of the object via the HMI 104, etc.). The retrieved data may include any data relating to the object, including labeling parameters generated using the techniques described herein, retailer-specific information for labeling (e.g., product identifier, product price, label format, product-specific information that is to be printed on labels for the product, etc.). The retrieved data may be utilized by the controller to perform one or more techniques described herein.

In some implementations, the ERP/WMS interface 106 can include one or more networks. For example, the network can be a packet-switching network that may include computer networks such as the Internet, local, wide, metro, or other area networks, intranets, satellite networks, other computer networks such as voice or data mobile phone communication networks, or combinations thereof. The controller 102 (or in some implementations, the HMI 104) can communicate via the network and/or the ERP/WMS interface 106 with one or more remote computing systems, which may maintain or store any external data that is retrieved or accessed by the controller 102 or the HMI. The network may be any form of computer network that can relay information between the various computing devices or components described herein. In some implementations, the network may include the Internet and/or other types of data networks, such as a local area network (LAN), a wide area network (WAN), a cellular network, a satellite network, or other types of data networks. The network may also include any number of computing devices (e.g., computers, servers, routers, network switches, etc.) that are configured to receive or transmit data within the network.

The detection camera 108 can be any suitable camera capable of capturing images of one or more streams of objects passing over the layup conveyor 122. The detection camera 108 can be, for example, a video camera having a predetermined resolution and frame rate. In some implementations, the system 100 can include multiple detection cameras 108, such as a stereo-camera pair positioned at predetermined poses and capable of detecting depth information. The detection camera 108 may be a 3D camera, such as a red-green-blue-depth (RGB-D) camera. The detection camera 108 may be capable of range imaging, which includes techniques that are used to produce a two-dimensional (2D) image showing the distance to points in a scene from the detection camera 108. The detection camera 108 may be communicatively coupled to the controller 102 via one or more communication interfaces or networks, and may communicate captured images to the controller 102 for further processing.

The detection camera(s) 108 can capture a video stream or a sequence of image frames of a stream of objects on the layup conveyor 122. The video stream or the sequence of image frames can be communicated to the controller 102, which can process the images using one or more object detection techniques to detect the position and orientation of objects in the video stream or the sequence of image frames. In some implementations, the detection camera(s) 108 can be controlled by the controller 102 or the HMI 104, for example, via instructions or signals generated by the controller 102 or the HMI 104 to begin or terminate the capture of video or image frames. In some implementations, an operator of the controller 102 or the HMI 104 can specify one or more image or video capturing parameters for the detection camera(s) 108. For example, the image or video capturing parameters may include a resolution, brightness, saturation, hue, focus, or post-processing settings (e.g., image sharping techniques, etc.).

The detection camera(s) 108 can include one or more illumination devices 109. The illumination devices 109 can illuminate a portion of the layup conveyor 122 according to one or more predetermine illumination parameters (e.g., brightness, illumination area, etc.). In some implementations, the illumination devices 109 can be in communication with and controlled by the controller 102 or the HMI 104. For example, the controller 102 or the HMI 104 may control the brightness of the illumination devices 109 to optimize how objects on the layup conveyor are illuminated, and to ensure that the objects appearing in the images or video captured by the detection camera(s) 108 can be properly detected. In some implementations, the controller 102 or the HMI 104 can automatically adjust the illumination parameters based on the labeling parameters associated with one or more objects on the layup conveyor. For example, an operator of the controller 102 can enter or scan an identifier or code associated with an object, and the controller 102 can retrieve the illumination parameters from the labeling parameters associated with the identifier or code, and provide signals to adjust the illumination devices 109 accordingly. In some implementations, an operator may manually adjust the illumination parameters for the illumination device 109 via the HMI 104.

The validation camera 112 can be any suitable camera capable of capturing images of one or more streams of objects passing on or to the exit conveyor 126. The validation camera 112 can be, for example, a video camera having a predetermined resolution and frame rate. The validation camera 112 may be similar to the detection camera 108. In some implementations, the system 100 can include multiple validation cameras 112, such as a stereo-camera pair positioned at predetermined poses and capable of detecting depth information. In some implementations, the validation camera 112 can include one or more barcode scanners or QR code scanners that scan a label that was applied to an object on the labeling conveyor 124 or the exit conveyor 126. The validation camera 112 may be communicatively coupled to the controller 102 via one or more communication interfaces or networks, and may communicate captured images to the controller 102 for further processing. The images from the validation camera 112 may be utilized to verify that labels have been properly applied (e.g., proper position and orientation) to objects on the labeling conveyor 124.

The validation camera(s) 112 can capture a video stream or a sequence of image frames of a stream of objects on the labeling conveyor 124 or the exit conveyor 126, after label(s) have been applied to objects passing through the system 100. The video stream or the sequence of image frames can be communicated to the controller 102, which can process the images using one or more detection techniques to detect the position and orientation of labels applied to objects by the robot 110. In some implementations, the validation camera(s) 112 can be controlled by the controller 102 or the HMI 104, for example, via instructions or signals generated by the controller 102 or the HMI 104 to begin or terminate the capture of video or image frames. In some implementations, an operator of the controller 102 or the HMI 104 can specify one or more image or video capturing parameters for the validation camera(s) 112. For example, the image or video capturing parameters may include a resolution, brightness, saturation, hue, focus, or post-processing settings (e.g., image sharping techniques, etc.).

The validation camera(s) 112 can include one or more illumination devices 113. The illumination devices 113 can illuminate a portion of the labeling conveyor 124 or the exit conveyor 126 according to one or more predetermine illumination parameters (e.g., brightness, illumination area, etc.). In some implementations, the illumination devices 113 can be in communication with and controlled by the controller 102 or the HMI 104. For example, the controller 102 or the HMI 104 may control the brightness of the illumination devices 113 to optimize how objects on labeling conveyor 124 or the exit conveyor 126 are illuminated, and to ensure that labels applied to the objects appear in the images or video captured by the validation camera(s) 112 and can be properly detected by the controller 102 or the HMI 104. In some implementations, the controller 102 or the HMI 104 can automatically adjust the illumination parameters based on the labeling parameters associated with one or more objects on the labeling conveyor 124 or the exit conveyor 126 (e.g., using information in the labeling parameters for the objects on the conveyor). In some implementations, an operator may manually adjust the illumination parameters for the illumination device 113 via the HMI 104.

The robot 110 can include a robotic arm 111 that is controlled by the controller. The robotic arm 111 can include one or more links, which may be connected by joints allowing either rotational motion or translational (linear) movement. The links of the robot 110 can be form a kinematic chain, which can be navigated in space to perform one or more functions described herein, such as applying labels or in some implementations adjusting positions of objects on the layup conveyor 122 or the labeling conveyor 124. The robot 110 can include one or more motors (e.g., servomotors, stepper motors), joints, and/or movable portions. The robot 110 can include an end portion that can retrieve labels from the label dispenser 116 and apply the labels to objects traversing the labeling conveyor 124. Motors in the robot 110 can cause the robotic arm 111 to rotate about its base, or to rotate one or more individual links to navigate the end portion of the robot 110 to predetermined positions. The position and orientation of the robot 110 can be controlled via signals from the controller 102. For example, using the techniques described herein, the controller 102 can generate signals to navigate the robot 110 upon detecting an object having a proper orientation on the layup conveyor 122 (e.g., via images captured from the detection camera 108).

The robot 110 can include an internal configuration (e.g., a default position and orientation) that may be stored locally by one or more computing device(s) of the robot 110, or received from the controller 102. The label applying end portion of the robot 110 may have a home reference position (e.g., at the 12 o'clock position), and may rotate up to 180 degrees clockwise to the 6 o'clock position and up to 180 degrees counter clockwise to the 6 o'clock position. The controller 102 can navigate the robot 110 to apply labels to objects on the labeling conveyor 124 without colliding with the objects or other components of the system 100. For example, to move the robot 110 from the 5 o'clock position to the 7 o'clock position, the controller 102 can generate instructions or signals to navigate the end portion of the robot 110 from the 5 o'clock position to the 12 o'clock position and then from the 12 o'clock position to the 7 o'clock position.

The robot 110 can be navigated based on the labeling parameters generated for objects passing through the system 100. The labeling parameters can define, in part, a path for the robot 110 to traverse to apply a label to the corresponding object. This avoids instances of collisions when the position of the label is not at the maximum height of the object. In such cases, if the robotic arm 111 could collide with the object unless a particular path is followed. To address this, the labeling parameters can be generated using the techniques described herein to include both the height of the object (such that the robot 110 avoids colliding with the top of the object) and the height at which the label is to be applied. In some implementations, the labeling parameters can include a navigation path that defines a path the robot 110 should follow to apply a label (e.g., as a sequence of commands or instructions to be provided by the controller 102). In some implementations, the controller 102 can generate instructions to navigate the robot 110 to avoid collisions with the object based on the height of the object and the height at which labels are to be applied. This enables objects with varying height to be automatically labeled without colliding with the robot.

For example, if the object to be labeled is a bowl and the label is to be placed at the center of the bottom of the bowl, the controller 102 can first navigate the end of the robotic arm 111 of the robot 110 horizontally (e.g., above the rim of the bowl to avoid hitting the bowl) and then when the end of the robotic arm 111 is directly above the center of the bowl, the controller 102 can navigate the end of the robotic arm 111 vertically downward to place the label at the center of the bottom of the bowl while avoiding contact with the rim. The height of the object, as well as the three-dimensional location (e.g., including depth), can be stored as part of the labeling parameters. Various techniques may be implemented by the controller 102 to avoid interference with objects in the system 100 when labeling using the robot 110. The robot 110 can be controlled such that the end of the robotic arm 111 typically does not go directly to the labelling position, but instead takes a path to avoid interference with the object or other objects on the labeling conveyor, if present.

The label-sticking end of the robot may include an air tube. Air pressure in the air tube is controlled by the controller 102 to pick up and release labels. For example, the controller may control the air pressure in the tube to cause suction at the end of the label-sticking end when positioned over the label to retrieve the label from the label dispenser 116. The robot 110 can then transport the label held by the label-sticking end to an object moving on the labeling conveyer 124. When the label-sticking end is position over the target label location on the object, the controller 102 may control the air pressure in the tube to cease the suction or cause positive pressure on the label so that the label is applied at the target label location.

In some implementations, in order to apply a large number of labels efficiently, it the robot 110 can be controlled such that the rotation of the axis of the label sticking end including the air tube is rotated relative to a reference position. For example, by rotating 150 degrees from the reference position, the label-sticking end of the robot 110 is prevented from getting entangled with the tube that supplies air to the robot to create the negative pressure. Rotational limits (e.g., a maximum of 180 degrees from the reference position) can be enforced by the robot 110 or the controller 102.

The printer 114 can be any type of printer that is capable of printing labels that can be adhered to objects passing through the system 100. The printer 114 may be ink-based printer, a thermal printer, or a laser printer (e.g., a toner-based printer). The printer 114 can be in communication with the controller 102 or the HMI 104 via one or more suitable communications interfaces or networks. In some implementations, the system 100 can include multiple printers 114, each of which may be capable of printing different types of labels, for example. The printer 114 can print labels for objects, for example, in response to signals from the controller 102 (e.g., which may retrieve and provide label data for one or more objects that are to be labeled in the system 100). The printer 114 can pre-print labels for objects in response to one or more signals from the controller 102. In some embodiments, the printer 114 can receive signals from the controller 102 or the HMI 104 that include information that is to be printed on a label. The signals may include signals or instructions to print a predetermined number of labels. In some embodiments, the labels can be printed on demand by the printer 114. For example, if the controller 102 detects (e.g., based on the images captured by the detection camera(s) 108) a particular object on the layup conveyor 122, the controller 102 can retrieve labeling information (e.g., information to print on the label) for the object from the ERP/WMS interface 106, and generate and transmit instructions to the printer 114 to print a label for the object that includes the labeling information.

Labels printed by the printer 114 can pass to a label dispenser 116. The label dispenser 116 can be a plate that receives the labels printed by the printer 114, such that they can be retrieved by the robot 110 to label objects in the system 100. In some implementations, the label dispenser 116 can be a container or other type of dispenser capable of storing and providing labels for the robot 110 to label objects in the system 100. The label storage can store pre-printed labels for one or more objects. In some embodiments, the label dispenser 116 may store labels for multiple different types of objects. For example, the label dispenser 116 may include one or more containers, racks, or conveyors that can store multiple different types of labels for different objects. The robot 110 can retrieve the pre-printed labels from the one or more label dispenser 116 to label one or more objects traversing the labeling conveyor 124.

In some embodiments, the label dispenser 116 can include one or more conveyors or mechanisms that can transport the labels to a position that can be easily accessed by the robot 110 without interfering or colliding with other components of the system 100. The label dispenser 116 may include a label transport conveyor (e.g., a conveyor belt). The use of a label transport conveyor allows the labels to be maintained at a proper position for retrieval by the label sticking end portion of the robot 110. For example, in circumstances where certain labels are back fed as part of the printing process, labels exiting the printer may become stuck and/or may not exit the printer lying flat.

The label dispenser 116 may include, for example, rollers placed above the label transport conveyor to contact and stabilize the labels and cause the labels to lie flat, such that they can easily be accessed by the robot 110. In some implementations, the rollers may be part of a jig that maintains the label in a predetermined position and/or orientation as it leaves the printer. In some implementations, the printer 114 may print several labels at a time (e.g., one row after another), each of which are transported by the label dispenser 116. Such an arrangement improves speed of transfer of the labels to the objects by ensuring that labels are always available for the robotic arm 111. The speed at which the label dispenser 116 provides labels may be controlled by signals or instructions generated by the controller 102 (e.g., such that the correct labels are available for the robot as the objects move along the labeling conveyor 124).

The layup conveyor 122, the labeling conveyor 124, and the exit conveyor 126 can each be conveyor belts capable of transporting one or more objects through the system 100 for labeling. The layup conveyor 122, the labeling conveyor 124, and the exit conveyor 126 may each include a belt that turns at a predetermined speed (e.g., a set number of rotations per minute). The belts of the layup conveyor 122, the labeling conveyor 124, and the exit conveyor 126 can include features that grip or otherwise cause objects placed on the belts to move along the belts as the belts turn (e.g., by friction force between the belt and the object caused by the weight of the object). Objects placed on the layup conveyor 122 can be carried to the labeling conveyor 124, which after labeling are transported to the exit conveyor. For example, the layup conveyor 122, the labeling conveyor 124, and the exit conveyor 126 may be placed end-to-end, or may include junctions or connectors that enable the transport of objects between the layup conveyor 122, the labeling conveyor 124, and the exit conveyor 126. The independent speed of the layup conveyor 122, the labeling conveyor 124, and the exit conveyor 126 can be controlled by the conveyor controls 120A, 120B, and 120C, respectively.

The conveyor controls 120A, 120B, and 120C (sometimes collectively referred to as the "conveyor controls 120") can include motors, gearboxes, and/or pulley systems that control the speed at which the layup conveyor 122, the labeling conveyor 124, and the exit conveyor 126 rotate. In some implementations, the conveyor controls 120A, 120B, and 120C can cause the layup conveyor 122, the labeling conveyor 124, and the exit conveyor 126 to rotate independently (e.g., at different speeds). In some implementations, the conveyor controls 120A, 120B, and 120C can cause the layup conveyor 122, the labeling conveyor 124, and the exit conveyor 126 to rotate at the same speed. The conveyor controls 120A, 120B, and 120C can each be in communication with the controller 102 via a suitable communications interface or network. The controller 102 can control the speed of the layup conveyor 122, the labeling conveyor 124, and the exit conveyor 126 by generating and transmitting corresponding signals to each of the conveyor controls 120A, 120B, and 120C.

In some implementations, the controller 102 can set the speed of the layup conveyor 122, the labeling conveyor 124, and the exit conveyor 126 based on linear length of an object along the direction of flow through the system 100. The speed and direction of the conveyors can be varied as objects are detected (e.g., in real-time or in near real-time). In some implementations, the speeds and directions of the layup conveyor 122, the labeling conveyor 124, and the exit conveyor 126 can be automatically determined by the controller 102 based on the object size determined by the detection camera(s) 108. The conveyors typically may move continuously, but may be sped up or slowed down according to differently sized or oriented objects flowing through the system. The direction of the conveyors may also be changed according to the position of objects in the system 100. Although the system 100 is shown as including three conveyors (e.g., the layup conveyor 122, the labeling conveyor 124, and the exit conveyor 126), it should be understood that the system 100 may be implemented with any number of conveyors, such as a single-conveyor system, or a system having more than three conveyors. Each conveyor may be controlled by a respective control device, or a control device may control one or more groups of conveyors in the system 100.

Varying the speed of the layup conveyor 122, the labeling conveyor 124, and the exit conveyor 126 can optimize the throughput of labeling in the system. For example, if the speed of the conveyors of the system 100 is held constant, the speed at which objects move past the robot 110 for labeling changes depending on the size and orientation of the objects, which may reduce the efficiency of the system. To improve system efficiency and throughput, the speeds of the layup conveyor 122, the labeling conveyor 124, and the exit conveyor 126 (or in some implementations, any one of the layup conveyor 122, the labeling conveyor 124, and the exit conveyor 126 individually) are dynamically controlled based on the size of the object (e.g., length, width, height) as detected, retrieved, or otherwise maintained by the controller 102.

The defect handler 118 can be positioned, for example, as part of the exit conveyor 126, or separate from the conveyors of the system 100. The defect handler 118 can redirect objects that are detected as being incorrectly labeled (e.g., via images captured by the validation camera 112). The defect handler 118 may be, for example, a separate pathway in which rejected objects are navigated (e.g., by an actuator, automatic separator, etc.). In such implementations, the defect handler 118 may include an actuator or other mechanism that can remove objects from the exit conveyor 126. The controller 102 can detect rejected objects based on images from the detection camera 108 (e.g., in the case of an incorrectly oriented object detected on the layup conveyor 122 that cannot be properly labeled) or the validation camera 112 (e.g., in the case where an object was labelled improperly or no label was applied, etc.). If a rejected object is detected, the controller 102 can transmit a signal to activate the defect handler 118, which can remove or otherwise redirect the rejected object from the exit conveyor 126. The object can be redirected to a separate conveyor for manual processing, or fed back to the layup conveyor by other components for re-labeling.

Referring now to the operations of the controller 102, the controller 102 can generate labeling parameters for objects by using a reference object (sometimes referred to herein as a "sample object"). The sample object can have similar physical characteristics (e.g., similar size, markings, etc.) to the corresponding objects that are to be labeled. Although the techniques relating to generating labeling parameters using a sample object are described in connection with the controller, it should be understood that these techniques may be performed by any type of computing device, which can subsequently communicate or otherwise provide the labeling parameters to the controller 102. The controller 102 can then utilize the labeling parameters to automatically label one or more objects moving through the system 100, as described herein.

To begin the process of generating labeling parameters for an object, the controller 102 can acquire an image of a sample object via a camera. The camera may be, for example, the detection camera 108 or a camera that is similar thereto. Acquiring the image of the sample object can include receiving an image from an external computing system (e.g., an external camera, smart phone, etc.), or providing instructions to the camera to capture an image of the sample object (e.g., in response to input at an input device, such as an input device of the HMI 104). The sample object can be any type of object that may be used as a reference object for generating labeling parameters. In some implementations, the sample object may include one or more identifying features, such as identifying text, a logo, or other visual indicators that distinguish the sample object from other types of objects. The identifying feature can be any type of feature that can be used to recognize the sample object or determine an orientation of the sample object when other objects similar to the sample object are moving through the system 100 for labeling. In some implementations, the camera that captures the image of the sample object can be a 3D camera, and the image of the sample object can include depth information for each pixel. The depth information can be utilized to detect the height of the sample object and the 3D location at which the label is to be applied to objects similar to the sample object. In some implementations, the image from the 3D camera can be analyzed to determine the edges of the sample object depicted in the image. The edges can be translated (e.g., by mapping to a different reference frame) into the overall dimensions of the sample object. In some implementations, the edges of the sample object depicted in the image can be utilized to determine the orientation of the object.

To designate areas of interest (e.g., target label location, identifying feature location) on the sample object, a camera (e.g., the detection camera 108, the training camera 134, etc.) can capture one or more images of the sample object while one or more physical tokens positioned on the sample object. The camera can provide the images to the controller for further processing. In some implementations, multiple images of the sample object can be captured with or without tokens. The controller 102 can utilize the images of the sample object to generate labeling parameters for the sample object. In some implementations, the controller 102 can generate a unique identifier or code for the sample object when capturing the image(s) of the sample object, or when generating the labeling parameters for the sample object. The unique identifier or code can be stored in with the generated labeling parameters, such that the identifier or code can be scanned or otherwise provided to cause the controller 102 to retrieve the labeling parameters for labeling objects that pass through the system 100. An example image of a sample object is shown in FIG. 2.

Figure 1B:
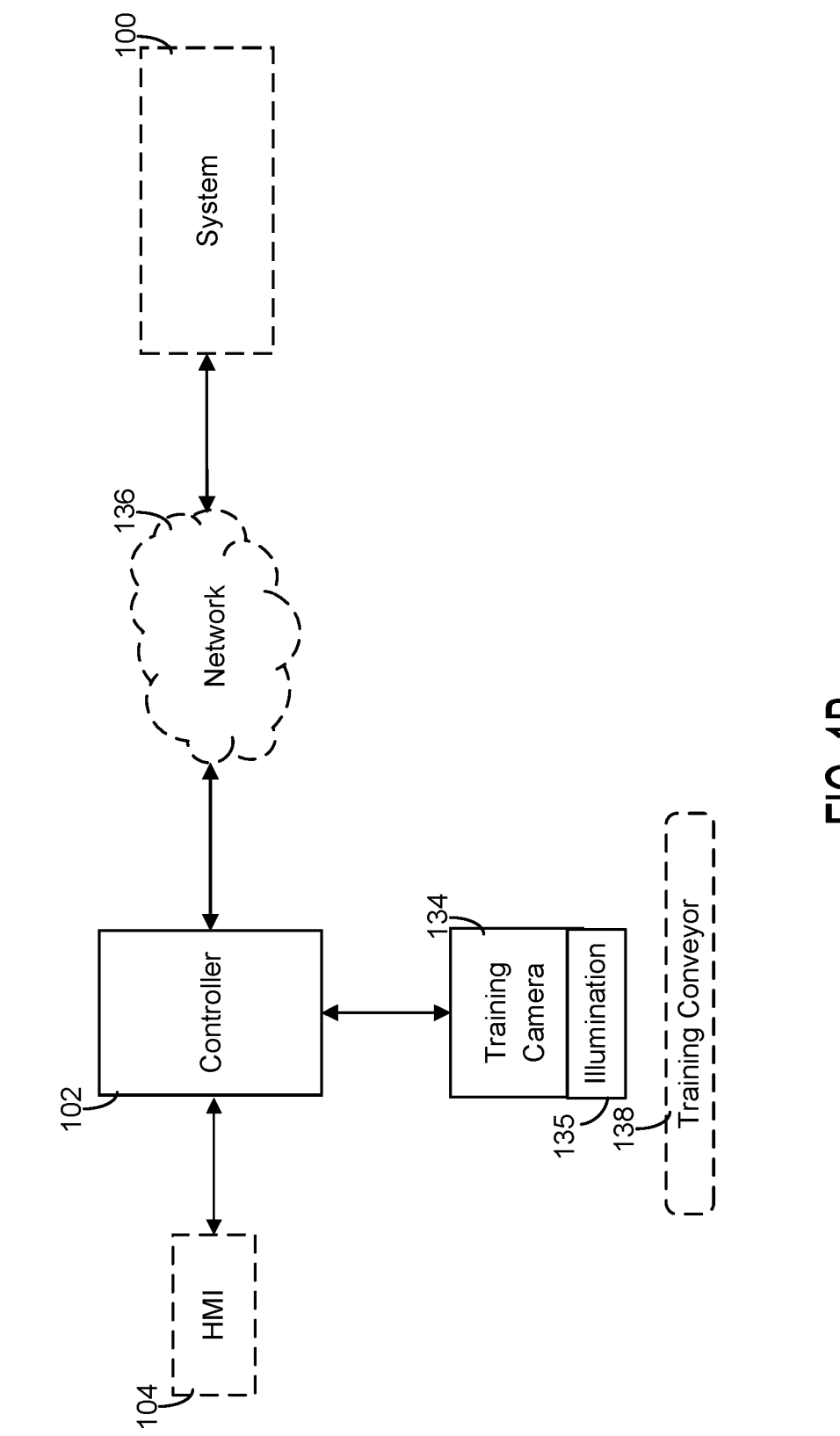
FIG. 1B is a block diagram of another example system for generating labeling parameters for sample objects, in accordance with one or more implementations.
Figure 2:
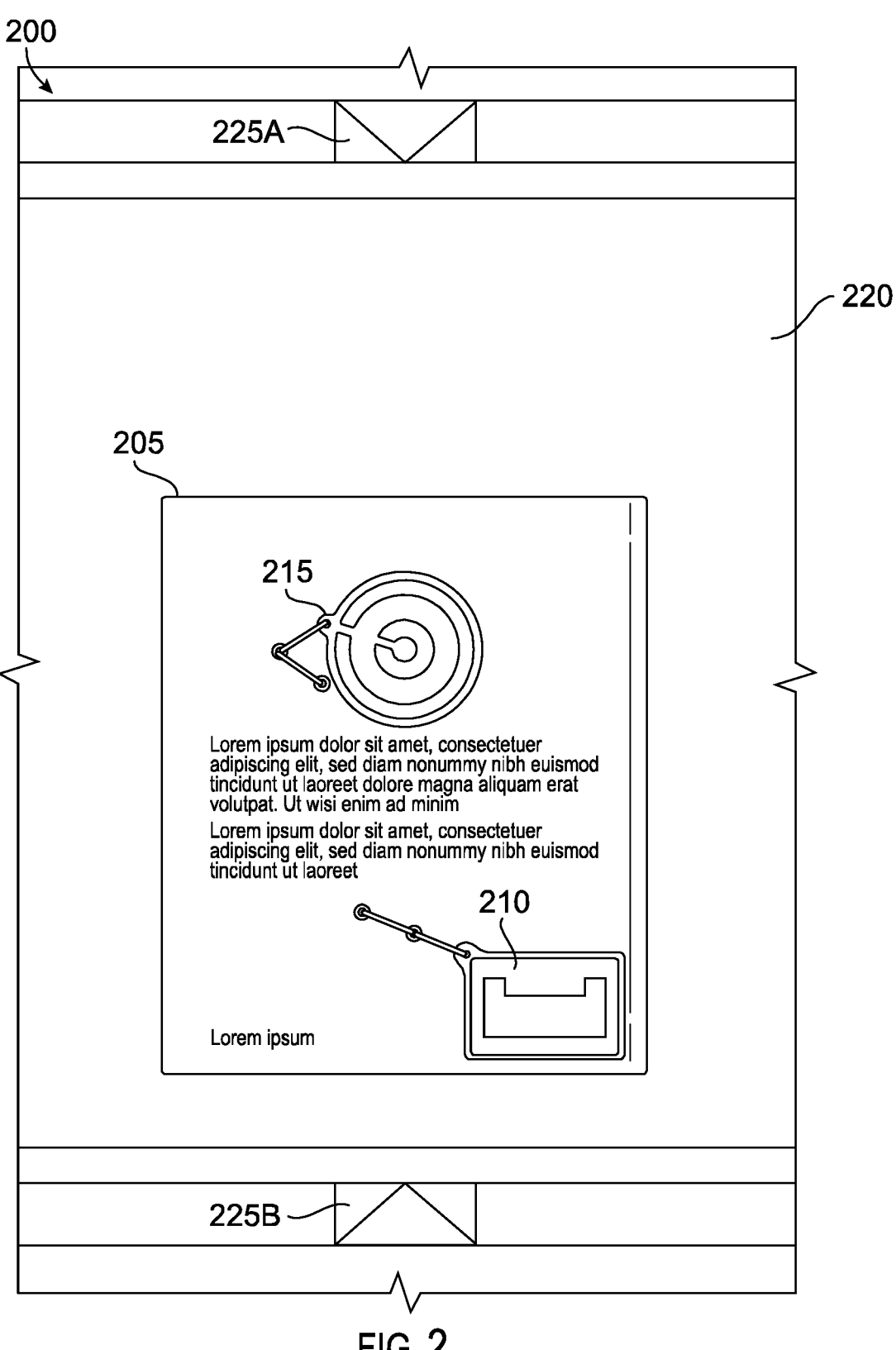
FIG. 2 is an image of a sample object with a first physical token indicating a location of label and a second physical token indicating an identification area of the sample object, in accordance with one or more implementations.

Referring to FIG. 2 in the context of the components described in connection with FIGS. 1A and 1B, illustrated is an example image 200 of a sample object 205 with a first physical token 210 indicating a location of label and a second physical token 215 indicating an identification area of the sample object. As shown, the sample object can be captured in a staging area 220. In some implementations, the staging area may include the reference markers 225A and 225B, which can guide an operator to place the reference object in a predetermined location and/or orientation in the staging area. As shown, the first physical token 210 can be placed in a desired location and/or orientation of the label. The size of the first physical token 210 may correspond to a desired size of the label that will be affixed to objects of the sample type as the sample object 205. The first physical token 210 may be positioned by the operator in a region that does not obstruct any identifying features of the image. In some implementations, the operator can utilize the camera to capture multiple images of the sample object.

An application executing on the controller 102 or the HMI 104 instructs the operator to place or remove one or more of the first physical token 210 and/or the second physical token 215 before capturing each image. In an embodiment where the tokens are physical tokens, the controller 102 (e.g., via the HMI 104) may prompt the user to capture a first image of the sample object 205 with the first physical token 210 and the second physical token 215, and subsequently capture a second image of the of the sample object without at least the second physical token 215. This can be performed without moving the sample object 205, which remains at the same position in the staging area 220 while both images are captured. In some embodiments, the controller 102 can be configured to detect and compensate for any changes in the position or orientation of the sample object 205 between images. The controller 102 can then extract the pixels corresponding to the region previously covered by the second physical token 215 from the second image, and the techniques described herein to generate labeling parameters for the sample object.

Referring back to FIG. 1A, once the image(s) of the sample object have been captured, the controller 102 can identify first and second tokens depicted in the image or positioned over the image of the sample object. The first and second tokens may be physical tokens (e.g., the first physical token 210 and the second physical token 215) positioned over respective portions of the sample object in the image. The physical tokens may have predetermined patterns or characteristics that can be detected by the controller 102 using an object detection or bounding box regression technique. The object detection or bounding box regression technique may include providing the image of the sample object as input to a machine-learning model. The machine-learning model may be a trained machine-learning model that includes one or more machine-learning layers (e.g., a fully connected layer, a convolutional neural network (CNN) layer, activation layers, soft-max layers, etc.).

The machine-learning model may include one or more other types of machine-learning models, such as light gradient boosting machine (LightBGM) models, Extreme Gradient Boosting (XGBoost) models Naïve Bayes classifiers, logistic regression classifiers, deep neural networks (DNNs), sparse vector machine (SVM) classifiers, random forest classifiers, and decision tree classifiers, among others. The machine-learning model may be trained to detect and/or regress the regions in the image of the sample object that correspond to the physical tokens. The machine-learning model may be pre-trained using, for example, a supervised learning technique (e.g., which may involve gradient descent and back-propagation) and training data that includes training images depicting sample objects and physical tokens with ground-truth data indicating the presence, location, and areas in the training images where the physical tokens are present. The machine-learning model can detect the areas in the image of the sample image that correspond to the one or more tokens.

In some implementations, the image of the sample object can be a 3D image. The 3D image can include depth information for each pixel in the image. In some implementations, the depth information may be captured by a second camera (e.g., a 3D camera), which may capture the same sample object as another camera that captures a 2D image that includes color data (e.g., red-green-blue (RGB) pixel data). In such implementations, the depth information from the 3D camera can be combined with the RGB pixel data of the 2D camera to generate a 3D image of the sample object. In some implementations, the camera can be an RGB-D camera that captures and RGB-D image of the sample object. The controller 102 can utilize the depth information in the sample image to determine one or more physical characteristics of the sample object. For example, the controller 102 may determine a height of the sample object. In some implementations, the controller 102 can utilize one or more reference points (e.g., reference points in a staging area, such as the staging area 220 of FIG. 2) to calculate the height of the sample object. Other characteristics of the sample object may be determined using the image of the sample object, such as the length and width of the sample object. In doing so, the controller can determine all 3D dimensions of the sample object, in addition to the respective locations and areas of the physical tokens positioned on the sample object and depicted in the image of the sample object.

The controller 102 may determine the locations (e.g., 3D locations) of the physical tokens positioned on the sample object. For example, the controller 102 can utilize the depth information (e.g., which may be relative to one or more reference points in a staging area on which the sample object is positioned when capturing the image of the sample object) to detect the height of each physical token, in addition to the 2D location of the tokens in the image. To do so, the controller 102 can utilize the machine-learning model (or another type of detection technique) to identify the 2D coordinates and areas of each pixel that corresponds to the physical tokens in the sample image. The orientations of the sample object and the tokens can be determined by analyzing the relative orientation of the sample object with respect to the overall extent of the image. The locations detected tokens (e.g., physical or virtual tokens) can be stored as position values that are relative to known points (e.g., fixed targets) within the overall image. The depth information of each pixel corresponding to a physical token can be utilized to calculate a height of the physical token. For example, the controller 102 may take an average of all the depth values of the pixels that correspond to a physical token in the image to determine the height of the physical token on the sample object. This process can be repeated for each physical token detected in the image of the sample object.

In some implementations, the image of the sample object may not include any physical tokens, and the locations of the label and any identifying features of the sample object may instead be defined via input to a graphical user interface. For example, the first and second tokens may be virtual tokens positioned over the image of the sample object (without any physical tokens) via input at the HMI 104, for example. The virtual tokens may be or may include regions of pixels in an image of the sample object that are designated by the operator of the controller 102. Two virtual tokens may be utilized, with a first token designated a target location at which labels are to be applied to the sample object, and a second token designated as the location at which identifying features are present on the sample object.

The HMI 104 or the controller 102 may execute an application that receives and processes images of the sample objects. The application may present user interfaces that may be similar to the user interfaces described in connection with FIGS. 3A and 3B. By interacting with corresponding user interface elements at the application, an operator can define regions of the image of the sample object as virtual tokens. A first virtual token may identify an area of the image of the sample object at which labels are to be applied, and a second virtual token may identify an area of the image of the sample object that includes one or more identifying features. The user input may include drag-and-drop interactions, which can define one or more locations or boundaries for the virtual tokens. Additional user input can be provided to resize and adapt (e.g., specify a shape) the virtual tokens to conform to the one or more identifying features of the sample object. If the user wants to ensure that the label goes on a specific side of the product (for example on the front and not on the back of the product), the one or more identifying features may not be located on multiple sides of the product. The one or more identifying features can be selected to be unique to every side of the sample object to ensure that the proper side is labeled.

The controller 102 can designate the detected location and area of the token corresponding to labeling location as part of the labeling parameters as a target label location. The target label location may be a 2D or 3D coordinate at which a label is to be applied to objects in the system 100 that are similar to the sample object. The coordinates may correspond to relative coordinates, which may be relative to any other location on the sample object, such as a detected of the sample object, a detected corner of the sample object, or an identifying feature of the sample object (e.g., relative to a location of the second token that corresponds to identifying features on the sample object). The target label location may include depth information as well as 2D coordinates for placing the label. The target label location may include orientation data (e.g., in degrees or radians, etc.) for placing labels relative to another feature of the sample object, relative to an orientation of the sample object, or relative to the second token.

The controller 102 can designate a location of the second token as an identifying information location that is identifiable to determine an orientation of the sample object. As described herein, the second token may cover (e.g., if the second token is a physical token) a portion of the sample object that includes an identifying feature, such as a logo, identifying text, or another type of identifying graphic or observable feature that can distinguish the sample object from other types of objects. The location of the second token (e.g., relative to one or more detected edges or corners of the sample object in the image of the sample object) can be designated as a location at which an identifying feature may appear. The edges and corners of the sample object in the image can be detected, for example, using a corner detection or edge detection technique (e.g., a trained edge-detection CNN or DNN, a Moravec corner detection technique, a Harris corner detection technique, Sobel, Canny, Prewitt, Roberts, and fuzzy logic edge detection techniques, etc.). The locations of one or more corners, as well as the location (e.g., including the relative location(s) relative to the corners or edges) of the second token, can be stored as part of the labeling parameters for the second object.

In some implementations, the controller 102 can extract one or more pixels from the image(s) of the sample object that correspond to the region in the image designated by the second token. For example, if the second token is a virtual token, the controller can extract the pixels designated by the second virtual token, and utilize information in the pixels to train a model to detect an orientation of an object having the identifying features. For example, the controller 102 may utilize data augmentation techniques (e.g., geometric transformations, color space transformations, random erasing, kernel filters, translation or rotation transformations, etc.) to generate a set of training data for a feature detection model.

The feature detection model may be trained from scratch on the set of training data, or may be pre-trained using predetermined training data and over-fitted or otherwise further trained on the set of training data, such that the feature detection model is trained to detect the identifying features designated by the second token. Any suitable training technique may be used to train the feature detection model, such as supervised learning, unsupervised learning, self-supervised learning, or semi-supervised learning. The weights, biases, or other trainable parameters may be iteratively updated based on a suitable gradient descent algorithm and/or a back-propagation algorithm. The feature detection model may receive an image as input, and can output a bounding region that corresponds to the identifying features of the sample object, if detected, as output. Using the relative locations of one or more corners or edges extracted from the image of the sample object relative to the second token, the controller 102 can determine an orientation of the object that is depicted in the image (e.g., an object moving through the system 100, as described herein). In some implementations, alternative techniques may be utilized to detect the presence, position, and orientation of the identifying features of the sample object. The trained feature detection model can be stored as part of the labeling parameters, with the relative positions of corners, edges, or other features of the sample object, such that the controller 102 can identify the position and orientation of objects having the same type as the sample object as the objects move through the system 100, as described herein.

In some embodiments, only one token may be utilized to generate labeling parameters for the sample object. For example, the sample object may be too small to position two tokens on the object, or the label area and identifying features may be in the same location on the object. In such implementations, the operator of the controller 102 may capture a first image of the sample object with just one physical token positioned on the sample object, and then may capture the second image of the sample object with the physical token removed. The controller 102 can designate the location and orientation of the single token as the location of the label in the labeling parameters for the sample object. The location and orientation may be relative to a corner of the sample object (e.g., a predetermined corner, a corner designated by the operator via a user interface presented by the HMI 104, etc.). The corner may be detected via a suitable corner detection algorithm, as described herein. Example user interfaces that prompt the user to capture multiple images of the sample object for training are shown in FIGS. 3A and 3B.

In some embodiments, the feature detection model can be trained based on pixels extracted from the second image of the sample object corresponding to the location at which the single token was positioned on the sample object. In such embodiments, the identifying feature(s) of the sample object (e.g., which may be used to detect the orientation of the sample object) are displayed at the same location as a desired label location on the sample object (e.g., as designated by the single token). The extracted features may be utilized to train the feature detection model, as described herein. In such embodiments, the trained feature detection model may be trained to detect the position or orientation of the sample object based on the identifying features.

In some embodiments, the sample object may not indicate any identifying features relative to a desired labeling location on the sample object (e.g., as designated by the single token). In such embodiments, the controller 102 can store the labeling location designated by the sample object as a relative location with respect to one or more corners or edges of the sample object, and can store the labeling location as part of the labeling parameters. During labeling using the labeling parameters, the controller 102 can detect the orientation of corresponding object traversing the layup conveyor 122, and can apply the label using the relative location and relative orientation indicated in the labeling parameters. In such embodiments, the label may be applied relative to any corner or edge of the object, as no particular identifying features can be extracted from the images of the objects traversing the layup conveyor 122.

Figure 3A:
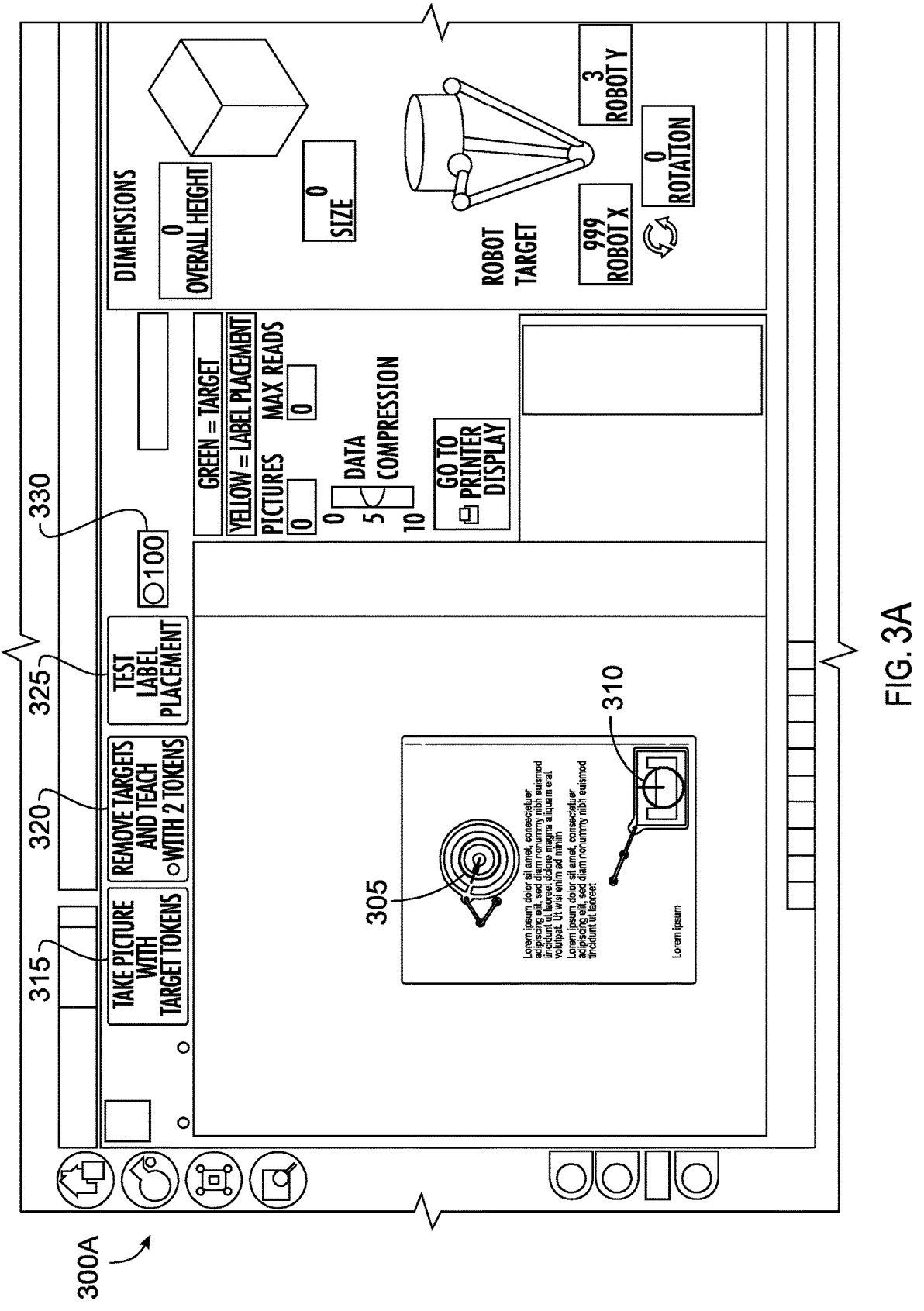
FIG. 3A is an example photograph of a graphical user interface showing an image of the sample object with identification and labeling tokens indicated, in accordance with one or more implementations.
Figure 3B:
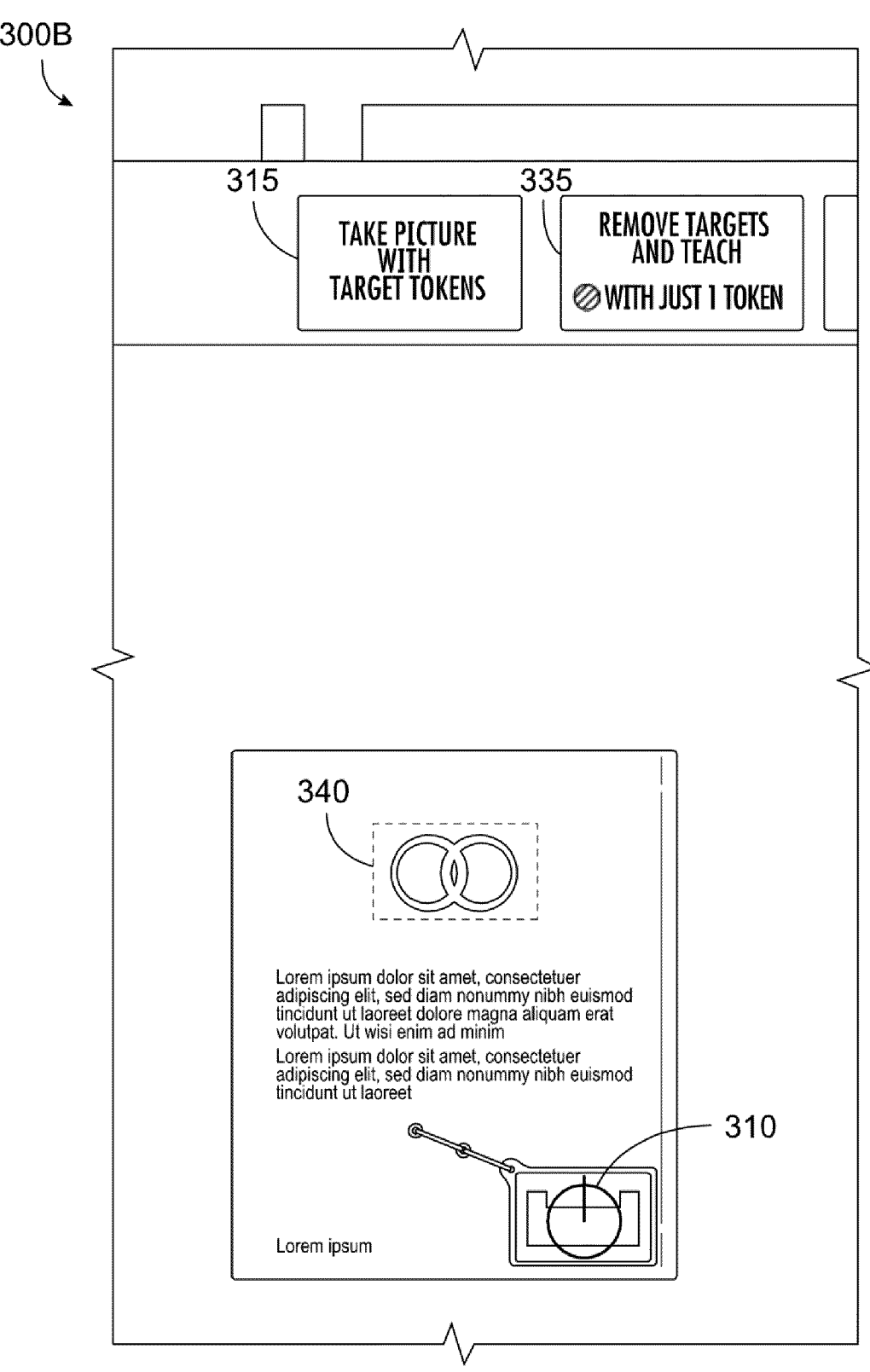
FIG. 3B is an example photograph of another embodiment of the graphical user interface of FIG. 3A in which one token is utilized, in accordance with one or more implementations.

Referring to FIG. 3A in the context of the components described connection with FIGS. 1A and 1B, depicted is an example photograph 300A of a graphical user interface showing an image of the sample object (e.g., the sample object 205 described in connection with FIG. 2) with indicators 305 and 310 of the identification labeling tokens (e.g., the tokens 215 and 210 of FIG. 2, respectively), in accordance with one or more implementations. The indicator 305 of the identification token and the second indicator 310 of the labeling token shown in the graphical user interface indicate that the position of the tokens have been correctly detected by the system. As shown, the graphical user interface includes the interactive graphical user interface elements 315, 320, and 325. The graphical user interface element 315 is a button that, when interacted with, can cause the controller to transmit an instruction to capture a first image of the sample object. As shown, the graphical user interface element 315 prompts the operator to position the tokens (e.g., the labeling token 215 and the identifying feature token 210 of FIG. 2) on the sample object prior to capturing the first image of the sample object. After capture, the first image can be displayed in the graphical user interface, with the indicators 305 and 310 (e.g., if two tokens are utilized). In some implementations, only one token (e.g., a token indicating the label position) is utilized, and the controller 102 performs the aforementioned training techniques based on any detected feature (e.g., edge, corner, object size, distinctive colors or patterns, etc.) in the image without the use of a second token. Approaches using one token may be utilized, for example, when the object is too small to position two tokens on the object, or the label area and identifying features are in the same location on the object.

The graphical user interface element 320 is a button that, when interacted with, can cause the controller 102 to transmit an instruction to capture a second image of the sample object. The second image of the sample object is captured when utilizing physical tokens, as described herein. If virtual tokens are utilized, a single image of the sample object can be used to train the system to recognize the position and orientation of the sample object. As shown, the graphical user interface element 320 prompts the operator to remove both tokens (e.g., the labeling token 215 and the identifying feature token 210 of FIG. 2) on the sample object prior to capturing the first image of the sample object. After capture, the controller 102 can perform the aforementioned training techniques to generate the labeling parameters for the sample object based on the first and second image. In addition, the graphical user interface may include a third interactive user interface element 325.

The graphical user interface element 325 is a button that, when interacted with, can cause the controller to verify that the labeling parameters generated for the sample object can be utilized to determine the orientation and/or position of the sample object. For example, upon interacting with the graphical user interface element 325, the controller 102 may prompt the user to reposition the sample object on the staging area (e.g., rotate the sample object, move the sample object to a different position within the field of view of the camera, etc.). The controller 102 can then transmit an instruction to the camera to capture a third image of the sample object. The controller 102 can then provide the third image as input to the feature detection model trained for the sample object, as described herein, or may perform one or more other techniques to detect the position and orientation of the sample object. A suitability score calculated by the controller 102, as described in further detail herein, can be displayed in the user interface element 330 based on the detected position and orientation of the sample object in the third image.

Referring to FIG. 3B in the context of the components described in connection with FIGS. 1A and 1B, depicted is an is an example photograph 300B of another embodiment of the graphical user interface of FIG. 3A in which one token is utilized, in accordance with one or more implementations. As shown, rather than the graphical user interface element 320 of FIG. 3A that prompts the operator to remove both tokens, the graphical user interface of FIG. 3B instead includes the interactive graphical user interface element 335, which prompts the user to remove the token that covers the location at which labels are to be applied to the sample object. In this example, a single token is utilized prior to capturing the second image of the sample object. A first image of the sample object (shown in the graphical user interface of FIG. 3B) can be captured, which includes the physical token 310 that covers the labeling location and does not include the token covering the identifying feature. Instead, the region 340 is exposed in the image, the pixels of which can be utilized (in addition to other pixels from the sample object) to train a feature detection model to determine the orientation and/or position of the sample object, as described herein. As described herein, after the first image is captured, the physical token 310 can be removed, and the second image can be captured in response to an interaction with the user interface element 335. In some implementations, the pixels in the second corresponding to the area that was previously covered by the token 310 can be extracted and utilized to train the feature detection model, as described herein.

Referring back to FIG. 1A, the controller 102 can determine a suitability score for recognition of the sample object based on the image(s) of the sample object (e.g., captured with and without tokens if using physical tokens, or captured without tokens if virtual tokens are utilized, etc.). When calculating the suitability score, the controller 102 ensure that the one or more identifying features of the sample object that were selected by the user (e.g., via token placement) is in fact unique to the remaining area of the captured image. The controller 102 can reduce the suitability score if there the one or more identifying features (or features similar thereto) are detected elsewhere in the image, or if the one or more identifying features have poor contrast compared to other regions in the image. In some implementations, the controller 102 can determine one or more illumination parameters for detecting the sample object based on the suitability score. For example, if the suitability score does not satisfy a threshold, the controller 102 may automatically vary one or more illumination conditions (e.g., illumination brightness, illumination area, etc.) until the suitability score satisfies a predetermined threshold. Each time the illumination parameters are varied, the controller 102 can capture another image of the sample object in the staging area, and calculate a corresponding suitability score. Once the suitability score satisfies the predetermined threshold, the controller 102 can store the illumination parameters as part of the labeling parameters for the sample object. In some implementations, the operator may manually vary the illumination parameters (e.g., by interacting with one or more graphical user interface elements displayed at the HMI 104), and instruct (e.g., via user input) the controller 102 to re-capture images of the sample object and re-calculate the suitability score based on the re-captured images. Once the suitability score satisfies the predetermined threshold, a corresponding indicator can be displayed at the graphical user interface.

The labeling parameters generated for the sample object can be stored by the controller 102, for example, in one or more data structures in association with a unique identifier for the sample object. The labeling parameters may be stored in a data repository for later retrieval (e.g., via the ERP/WMS interface 106). Although the generation of the labeling parameters is described herein as being performed by the controller 102, it should be understood that the labeling parameters may be generated for the sample object at any suitable computing system, such as a computing system that is remote from the controller 102. The labeling parameters can then be transmitted to, retrieved by, or otherwise provided to the controller 102, such that the controller 102 can utilize the labeling parameters to recognize and automatically label objects in the system 100, as described herein. As such, the generation of labeling parameters (sometimes called the "training process" or "teaching process") can be performed prior to and in preparation of labeling objects, and may be performed in a different location or at a different computing system than the controller 102. In some implementations, the labeling parameters may be stored in association with information that is to be printed on the labels, such as unique product codes, retailer information, or pricing information, among others.

The controller 102 can utilize the generated labeling parameters for a sample object to perform automatic labeling of objects by controlling the components of the system 100. To begin the labeling process for a particular object, an operator can scan or otherwise provide the unique identifier or code corresponding to an object (e.g., generated upon generating labeling parameters based on a sample object) to the controller 102 via the HMI 104. The identifier or code can be a barcode, a QR code, or may be a unique alphanumeric code that may be provided to the controller via one or more graphical user interfaces displayed at the HMI 104. In some implementations, the identifier or code may be retrieved or otherwise selected via a web-based interface or an application interface, which may be provided at least in part by the ERP/WMS interface 106.

Upon providing the code or identifier of the labeling parameters for the type of object that is to be labeled, the controller 102 can retrieve the label parameters corresponding to the code or identifier from a remote computing system, from the memory of the controller 102 or the HMI 104, or via the ERP/WMS interface 106. Retrieving the data can include accessing and loading the data in the labeling parameters into a region of memory at the controller 102, such that the data therein can be accessed and utilized to perform the techniques described herein. For example, the illumination parameters can be accessed and utilized to control the illumination devices 109 or 113. Additionally, the feature detection models or feature detection algorithms used to detect the orientation or position of the corresponding objects can be loaded for execution using images captured from the detection camera 108, along with the location at which to apply labels to the corresponding objects, and object size information (e.g., length, width, height, etc.).

Once the labeling parameters for the scanned object are loaded, the controller 102 may prompt the operator to begin loading the corresponding objects onto the layup conveyor 122. In some implementations, the controller 102 can generate and transmit signals to cause the layup conveyor 122, the labeling conveyor 124, and the exit conveyor 126 to begin turning at predetermined speeds (e.g., a default speed, which may be varied as described herein based on detected objected sizes, as described herein). The objects may be loaded onto the layup conveyor 122 such that the identifying features used to generate the labeling parameters are visible to the detection camera 108, such that images from the detection camera 108 can be utilized by the controller to detect the position, orientation, and dimensions of the objects on the layup conveyor 122.

As the objects move on the layup conveyor, the controller 102 can transmit one or more signals to the detection camera 108 to cause the detection camera 108 to capture a sequence of images of the objects on the layup conveyor 122, which are then provided to the controller 102 for processing. In addition, the controller 102 can transmit signals to the illumination device 109 based on the illumination parameters included in the labeling parameters for the object. This can optimize the illumination of the objects on the layup conveyor 124 such that they can be detected properly by the controller 102. To detect the objects, the controller 102 can provide the images captured by the detection camera 108 as input to the feature detection model trained based on corresponding sample object, as described herein. The output of the feature detection model can include a relative position and orientation of an identifying feature exposed on the object. If an object is detected (e.g., using an object detection model or bounding box regression algorithm) and the identifying feature is not present on the object, the controller 102 can flag the corresponding object as a rejected object. Rejected objects can be removed from the system by the defect handler 118, as described herein.

Upon detecting the object on the layup conveyor, the controller can detect a location and an orientation of the object in a stream of objects using the identifying information location in the labeling parameters. As described herein, the labeling information can include one or more relative locations of at least one detected identifying feature on the object. The position and orientation of the identifying feature may be relative to one or more edges, corners, or other detected features on the object. Using the relative positions of the identifying feature in the labeling parameters, and the detected position and orientation of the identifying feature in the image captured by the detection camera 108, the controller 102 can determine a position and orientation of the detected object on the layup conveyor 122. In some implementations, the object may be flagged as rejected if the orientation of the object does not enable labeling (e.g., the object is positioned such that the robot cannot access the location of the label, etc.).

Once the position and orientation of the object on the layup conveyor 122 has been determined, the controller 102 can determine the location and orientation at which the label should be applied to the object. For example, based on the relative location of the label in the labeling parameters from the identifying feature on the object, the controller 102 can calculate an offset (e.g., by mapping the relative location to the same frame of reference as the detected object orientation) for the location and the orientation at which the label should be applied.

The dimensions of the object, as specified in the labeling parameters of the object, can be utilized to optimize the speed at which the layup conveyor 122, the labeling conveyor 124, and the exit conveyor 126 turn. The controller can vary the speed of the layup conveyor 122, the labeling conveyor 124, and the exit conveyor 126 by transmitting corresponding control signals to the conveyor controls 120A, 120B, and 120C. Varying the speed of the objects can be performed to compensate for differing product along the direction of flow through the system 100, enabling the robot 110 to be controlled at a consistent and optimal cadence. The speed can be varied according to the length and/or width of the detect object, each of which may be stored as part of the labeling parameters for the object.

Once an object has been detected by the controller 102, the controller can retrieve (e.g., from the ERP/WMS interface 106, or the memory of the controller 102) information that is to be printed on the label for the object. The information can be utilized to generate signals for the printer 114 to print one or more labels for the detected object. If multiple objects are detected by the controller 102, the controller 102 can transmit signals for the printer 114 to print multiple labels (e.g., each for the corresponding object). The printed labels can be dispensed by the label dispenser 116 for retrieval by the robot 110, as described herein.

As the detected object travels to the labeling conveyor 124, the controller 102 can transmit control signals to the robot 110 to cause the robotic arm 111 of the robot 110 to navigate to the label dispenser to retrieve the label for the object. The robot 110 can be navigated according to a reference position, as described herein, to avoid interference with an air supply tube of the robot 110 or other components of the system 100. Once the label has been retrieved, the controller 102 can cause the robotic arm 111 of the robot 110 to apply the retrieved label to the detected object based on the detected location and orientation the object and the target label location calculated for the object (e.g., the offset).

To navigate the robot, the controller 102 can transmit signals to the robot 110 to move the label-sticking end of the robot to move over the top of the object, above the height of the object. For example, the controller 102 can first navigate the robot vertically, such that the robot 110 provides clearance and avoids a collision with the object. The controller 102 can also navigate the robot horizontally, such that the label-sticking end is above the relative location for the label on the object, at the corresponding orientation (e.g., by rotating the label-sticking end of the robot 110) at which the label is to be applied to the object. The controller 102 can then navigate the robotic arm 111 of the robot 110 vertically (using corresponding control signals) to lower the label-sticking end of the robot to apply the label to the object, as the object is moving on the labeling conveyor 124. As such, the robotic arm 111 can continuously move with the object as the object traverses the labeling conveyor 124. Applying the label to the object can include providing a signal to cause the robot 110 to release the label from the label sticking end of the robotic arm 111. In some implementations, the signal can cause the robot 110 to force the label onto the object (e.g., using mechanical force or a blast of air from the air tube).

After the object has been labeled by the robot 110, the labeled object can continue to traverse down the labeling conveyor 124 towards (or onto) the exit conveyor. The controller can verify the label was correctly applied to the object. Once the object has been labeled, the controller 102 can transmit instructions or commands to the validation camera 112 to capture one or more images of the label applied to the object, which can be used to verify that the label has been applied to the object. The images can be provided to the controller 102, which can utilize one or more object detection techniques, machine-learning models, or code-scanning techniques (e.g., decode a bar code or 2D Code (such as a QR code) on the label represented in the image) to detect whether the label has been applied to the object. In some implementations, the validation camera 112 may itself include a barcode or QR code scanner, which can scan bar codes or QR codes present on the labels applied to the objects and transmit corresponding validation signals if the barcode or QR is successfully scanned. The validation signals can indicate that the label has been correctly applied to the object. If the label has been applied to the object, the controller can enable the object to continue to traverse the exit conveyor 126 to the next stage of object processing. If the label is not detected on the object, the controller 102 can transmit instructions or commands to the defect handler 118 to remove the mislabeled object from the exit conveyor, as described herein. Verification of the applied label assures only objects that are properly labeled are passed downstream.

The techniques described here can be performed to automatically apply labels to any number of objects. In some implementations, the controller 102 can be utilized to apply labels to several different types of objects in a single stream of objects. For example, the controller 102 may load multiple labeling parameters for multiple different objects, and utilize object recognition techniques to differentiate (and calculate the corresponding label positions) for the respective objects as they pass through the system 100. In some implementations, the controller 102 may implement only one set of labeling parameters at a time, such that only a single type of object may be labeled by the system 100 at a time. In such implementations, the system 100 can be initialized for different types of objects by scanning or otherwise providing an identifier or code for a different object, which causes the controller 102 to retrieve and implement the labeling parameters for that object, as described herein.

Although not shown in FIG. 1A, the system 100 can include one or more interfaces to upstream and downstream conveyor systems to allow custom integration into unit handling and automation systems. As such, the components of the system 100 may be inserted into an existing object transport system to enable automatic labeling of products using the techniques described herein. Additionally, the system 100 may include one or more remote diagnostic and management interfaces, which may provide reviewable video of activities performed by the components of the system 100. For example, the system 100 may include one or more additional sensors or cameras that provide diagnostic information about the components of the system 100. The diagnostic data may be provided to one or more remote computing systems via a network, or for display at the HMI 104.

Referring to FIG. 1B, illustrated is a block diagram of another example system 130 for generating labeling parameters for sample objects, in accordance with one or more implementations. FIG. 1B illustrates an embodiment in which the controller 102 is remote from the system 100. As shown, the system 130 can include a controller, a training camera 134, and may optionally include a network 136 and the system 100. The system 130 can include an illumination device 135, which may be similar to the illumination device 109 or the illumination device 113. In some implementations, the system 130 can optionally include an HMI 104, which may be communicatively coupled with the controller 102 and may be utilized to interface with an operator during training. The illumination device 135 can be controlled by the controller 102 or the HMI 104. The system 130 may optionally include a training conveyor 138, which can be utilized to move a sample object into position for training, and then out of the way in anticipation of another training cycle for a different sample object. The training conveyor 138 may be similar to the layup conveyor 122, the labeling conveyor 124, or the exit conveyor 126.

In the embodiment shown in FIG. 1B, the controller 102 is remote from the system 100, and may communicate with one or more components of the system 100 via a suitable communications interface, such as the network 136. The network 136 can be a packet-switching network that may include computer networks such as the Internet, local, wide, metro, or other area networks, intranets, satellite networks, other computer networks such as voice or data mobile phone communication networks, or combinations thereof. The controller 102 can communicate via the network 136 with the system 100, or one or more remote computing systems (e.g., which may maintain or store any data that is retrieved, accessed, or provided by the controller 102). The network 136 may be any form of computer network that can relay information between the various computing devices or components described herein. In some implementations, the network 136 may include the Internet and/or other types of data networks, such as a LAN, a WAN, a cellular network, a satellite network, or other types of data networks. The network may also include any number of computing devices (e.g., computers, servers, routers, network switches, etc.) that are configured to receive or transmit data within the network.

The training camera 134 can be any suitable camera capable of capturing images of one or more streams of objects passing over the layup conveyor 122. The training camera 134 can be, for example, a video camera having a predetermined resolution and frame rate. In some implementations, the system 130 can include multiple training camera 134, such as a stereo-camera pair positioned at predetermined poses and capable of detecting depth information. In implementations where the system 130 includes multiple training cameras 134, the training cameras 134 may include a 3D camera, such as an RGB-D camera, an infrared camera, or a camera capable of capturing depth information, in combination with a 2D camera. In some implementations, the training camera 134 may include a single 3D camera or a single 2D camera. The training camera 134 may be capable of range imaging, which includes techniques that are used to produce a 2D image that includes data for the distance to points in a scene from the training camera 134. The training camera 134 may be communicatively coupled to the controller 102 via one or more communication interfaces or networks, and may communicate captured images to the controller 102 for further processing.

In the embodiment described in connection with FIG. 1B, the controller 102 may perform any of the functionality described herein with respect to generating labeling parameters using sample images. However, rather than performing training in the labeling system 100, the controller 102 is remote from the system 100 and may optionally be in communication with the system 100. The controller 102 may present user interfaces to prompt the operator to capture one or more images of a sample object, as well as position one or more tokens on the sample object (or over the image of the sample object, if virtual tokens are utilized).

The controller 102 can utilize the training camera 134 to capture one or more images of the sample object while one or more physical tokens positioned on the sample object. The images of the sample object can be captured, for example, in a staging area (e.g., the staging area 220 of FIG. 2) within the field of view of the training camera 134. The training camera 134 can provide the images to the controller 102 for further processing. In some implementations, multiple images of the sample object can be captured with or without tokens. In some implementations, a captured image of the sample object can be displayed in a user interface that enables an operator to position one or more virtual tokens over regions of the image that correspond to a label location or an identifying feature location. The controller 102 can utilize the images of the sample object to generate labeling parameters for the sample object, as described herein.

Once generated, the controller 102 may store the labeling parameters for the sample object in association with an identifier or code for the sample object. The stored labeling parameters may later be retrieved by or provided to the system 100, as described herein. In some implementations, the labeling parameters may be transmitted to a remote data repository via the network 136, or to the ERP/WMS interface 106 described in connection with FIG. 1A. In the embodiment of FIG. 1B, the controller 102 may be a second controller that is remote from a first controller 102 of the system 100.

Figure 4:
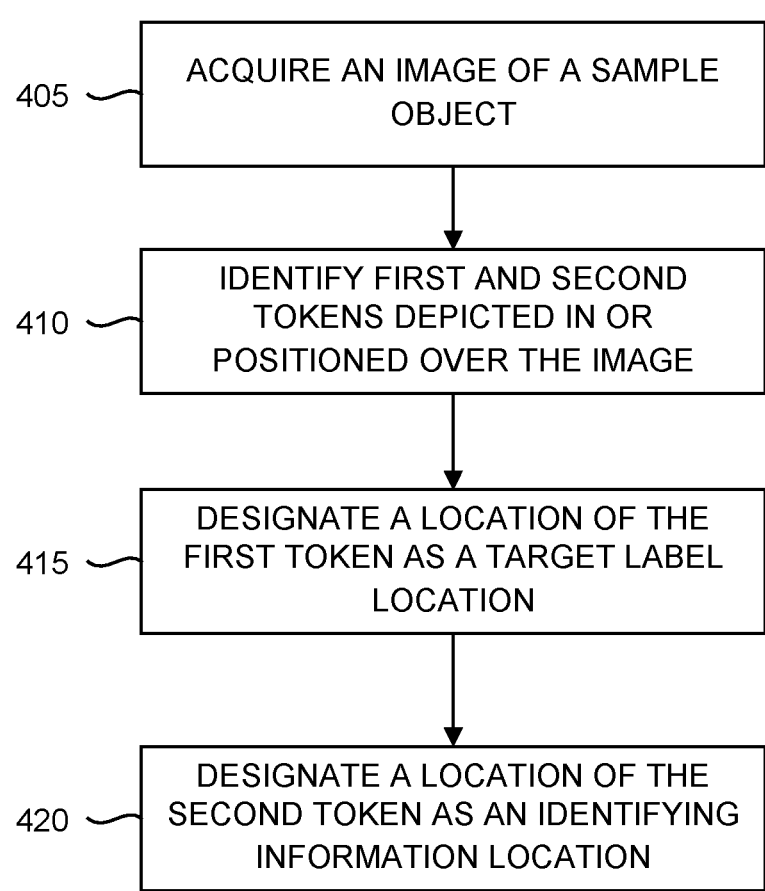
FIG. 4 is a flowchart of an example method of using an automatic labeling system, in accordance with one or more implementations.

FIG. 4 is a flowchart of an example method 400 of using an automatic labeling system (e.g., the system 100), in accordance with one or more implementations. The method 400 includes steps 405-420, and may be performed, for example, by the components of the system 100 as described herein. However, other embodiments may include additional or alternative steps, or may omit one or more steps altogether. Although the steps of the method 400 are described as being performed in a particular order, it should be understood that certain steps may be performed in alternate orders while still achieving useful results. The method 400 is described as being executed by a controller, such as the controller 102 of FIGS. 1A and 1B.

At step 405, the controller can acquire an image of a sample object via a camera (e.g., the detection camera 108, another camera in communication with the controller, etc.). Acquiring the image of the sample object can include receiving an image from an external computing system (e.g., an external camera, smart phone, etc.), or providing instructions to the camera to capture an image of the sample object (e.g., in response to operator input at an input device). The sample object can be any type of object that may be used as a reference object for generating labeling parameters. In some implementations, the sample object may include one or more identifying features, such as identifying text, a logo, or other visual indicators that distinguish the sample object from other types of objects. The identifying feature can be any type of feature that can be used to recognize the sample object or determine an orientation of the sample object when other objects similar to the sample object are labeled. In some implementations, the camera that captures the image of the sample object can be a 3D camera, and the image of the sample object can include depth information for each pixel. The depth information can be utilized to detect the height of the sample object and the 3D location at which the label is to be applied to objects similar to the sample object. The camera can capture one or more images of the object, and provide the images to the controller for further processing.

At step 410, the controller can identify first and second tokens depicted in or positioned over the image. To designate areas of interest (e.g., label location, identifying feature location) on the sample object, the image of the sample object can be captured with one or more physical tokens positioned on the object. In some implementations, multiple images of the sample object can be captured with or without tokens. The controller can utilize the images of the sample object to generate labeling parameters for the sample object. In some implementations, the controller can generate a unique identifier or code for the sample object when capturing the image(s) of the sample object, or when generating the labeling parameters for the sample object. The unique identifier or code can be stored in with the generated labeling parameters, such that the identifier or code can be scanned or otherwise provided to cause the controller to retrieve the labeling parameters for labeling objects.

The first and second tokens may be physical tokens positioned over respective portions of the sample object in the image. The physical tokens may have predetermined patterns or characteristics that can be detected by the controller using an object detection or bounding box regression technique. The object detection or bounding box regression technique may include providing the image of the sample object as input to a machine-learning model. The machine-learning model may be a trained machine-learning model that includes one or more machine-learning layers (e.g., a fully connected layer, a CNN layer, activation layers, softmax layers, etc.). The machine-learning model may be trained to detect and/or regress the regions in the image of the sample object that correspond to the physical tokens. The machine-learning model may be pre-trained using, for example, a supervised learning technique (e.g., which may involve gradient descent and back-propagation) and training data that includes training images depicting sample objects and physical tokens with ground-truth data indicating the presence, location, and areas in the training images where the physical tokens are present. The machine-learning model can detect the areas in the image of the sample image that correspond to the one or more tokens.

The controller can determine the locations (e.g., 3D locations) of the physical tokens positioned on the sample object. For example, the controller can utilize the depth information (e.g., which may be relative to one or more reference points in a staging area on which the sample object is positioned when capturing the image of the sample object) to detect the height of each physical token, in addition to the 2D location of the tokens in the image. To do so, the controller can utilize the machine-learning model (or another type of detection technique) to identify the 2D coordinates and areas of each pixel that corresponds to the physical tokens in the sample image. The depth information of each pixel corresponding to a physical token can be utilized to calculate a height of the physical token. For example, the controller may take an average of all the depth values of the pixels that correspond to a physical token in the image to determine the height of the physical token on the sample object. This process can be repeated for each physical token detected in the image of the sample object.

In some implementations, the image of the sample object may not include any physical tokens, and the locations of the label and any identifying features of the sample object may instead be defined via input to a graphical user interface. For example, the first and second tokens may be virtual tokens positioned over the image via input at an HMI (e.g., the HMI 104), for example. The HMI or the controller may execute an application that receives and processes images of the sample objects. The application may present user interfaces that may be similar to the user interfaces described in connection with FIGS. 3A and 3B. By interacting with corresponding user interface elements at the application, an operator can define regions of the image of the sample object as virtual tokens. A first virtual token may identify an area of the image of the sample object at which labels are to be applied, and a second virtual token may identify an area of the image of the sample object that includes one or more identifying features. The user input may include drag-and-drop interactions, which can define one or more locations or boundaries for the virtual tokens, as well as interactions to resize for the virtual tokens and change or select the shape of the virtual tokens.

In some implementations, the positions of the virtual tokens may be automatically determined by the controller. For example, the controller may implement a fuzzy logic that automatically detects candidate locations for the virtual tokens (as well as a size and shape for the virtual tokens). The virtual tokens can then be displayed (e.g., via the HMI) as an overlay on the image of the sample object. The HMI may also present information about the sample object, such as indicators of the edges of the sample object, an identifier of the sample object, and the size of the sample object, among other information. In such implementations, the virtual tokens are automatically added by the controller, rather than being added via user input. Additional user input can then be provided via the HMI to adjust the size, location, or shape of the virtual tokens to conform to the one or more identifying features of the sample object and the labeling location on the sample object, if needed. The user can provide additional input to accept the locations of the virtual tokens. In some implementations, if the placement of the virtual tokens determined by the controller is acceptable, the user may provide input to accept the virtual tokens without modifying the size, location, or shape of the tokens.

At step 415, the controller can designate a location of the first token as a target label location. The target label location may be a 2D or 3D coordinate at which a label is to be applied to objects that are similar to the sample object. The coordinates may correspond to relative coordinates, which may be relative to any other location on the sample object, such as a detected of the sample object, a detected corner of the sample object, or an identifying feature of the sample object (e.g., relative to a location of the second token that corresponds to identifying features on the sample object). The target label location may include depth information as well as 2D coordinates for placing the label. The target label location may include orientation data (e.g., in degrees or radians, etc.) for placing labels relative to another feature of the sample object, relative to an orientation of the sample object, or relative to the second token.

At step 420, the controller can designate a location of the second token as an identifying information location. As described herein, the second token may cover (e.g., if the second token is a physical token) a portion of the sample object that includes an identifying feature, such as a logo, identifying text, or another type of identifying graphic or observable feature that can distinguish the sample object from other types of objects. The location of the second token (e.g., relative to one or more detected edges or corners of the sample object in the image of the sample object) can be designated as a location at which an identifying feature may appear. The edges and corners of the sample object in the image can be detected, for example, using a corner detection or edge detection technique (e.g., a trained edge-detection CNN or DNN, a Moravec corner detection technique, a Harris corner detection technique, Sobel, Canny, Prewitt, Roberts, and fuzzy logic edge detection techniques, etc.). The locations of one or more corners, as well as the location (e.g., including the relative location(s) relative to the corners or edges) of the second token, can be stored as part of the labeling parameters for the second object.

Figure 5:
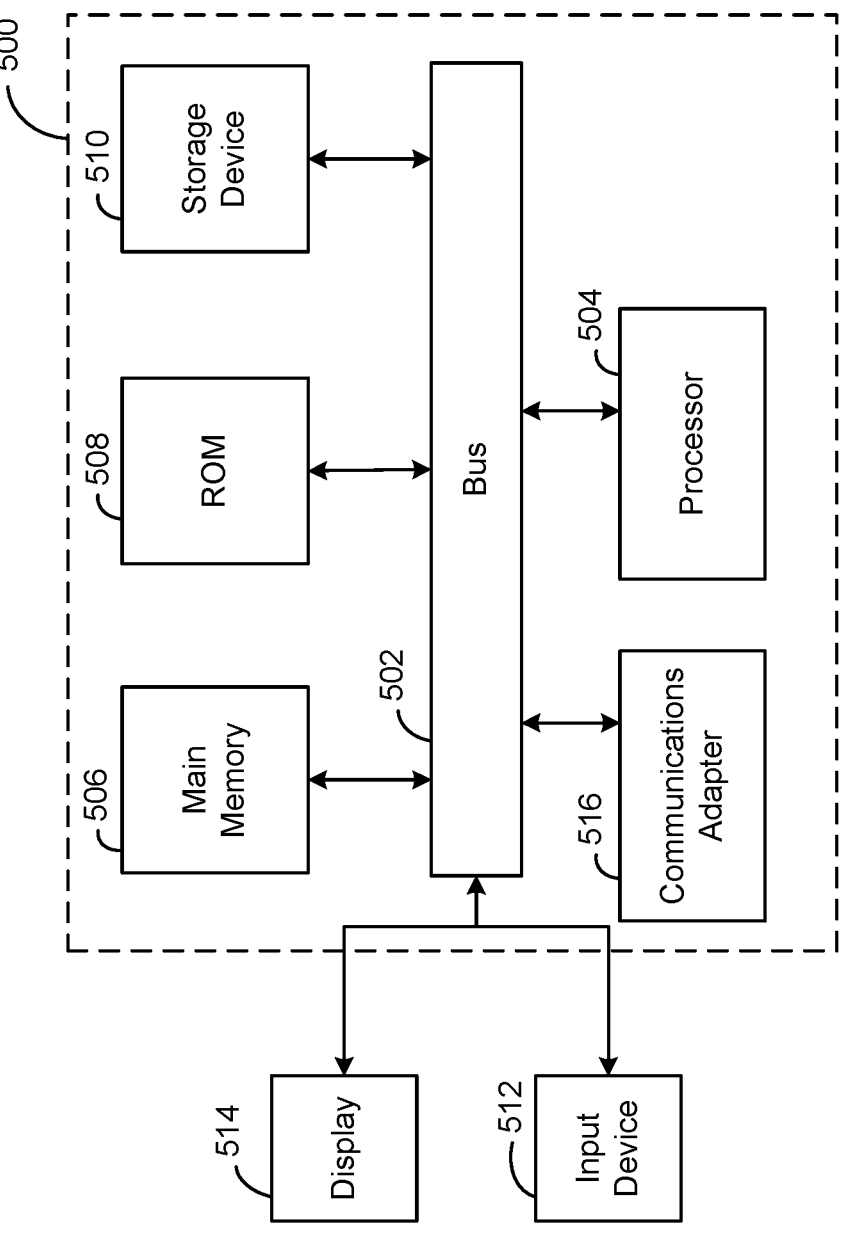
FIG. 5 is a block diagram of an example computing system suitable for use in the various arrangements described herein, in accordance with one or more example implementations.

Referring to FIG. 5, illustrated is a component diagram of an example computing system suitable for use in the various implementations described herein. For example, the computing system 500 may implement the controller 102 of FIGS. 1A and 1B, or the human-machine interface 104 of FIG. 1A, or various other example systems and devices described in the present disclosure.

The computing system 500 includes a bus 502 or other communication component for communicating information and a processor 504 coupled to the bus 502 for processing information. The computing system 500 also includes main memory 506, such as a RAM or other dynamic storage device, coupled to the bus 502 for storing information, and instructions to be executed by the processor 504. Main memory 506 can also be used for storing position information, temporary variables, or other intermediate information during execution of instructions by the processor 504. The computing system 500 may further include a ROM 508 or other static storage device coupled to the bus 502 for storing static information and instructions for the processor 504. A storage device 510, such as a solid-state device, magnetic disk, or optical disk, is coupled to the bus 502 for persistently storing information and instructions.

The computing system 500 may be coupled via the bus 502 to a display 514, such as a liquid crystal display, or active matrix display, for displaying information to a user. An input device 512, such as a keyboard including alphanumeric and other keys, may be coupled to the bus 502 for communicating information, and command selections to the processor 504. In another implementation, the input device 512 has a touch screen display. The input device 512 can include any type of biometric sensor, or a cursor control, such as a mouse, a trackball, or cursor direction keys, for communicating direction information and command selections to the processor 504 and for controlling cursor movement on the display 514.

In some implementations, the computing system 500 may include a communications adapter 516, such as a networking adapter. Communications adapter 516 may be coupled to bus 502 and may be configured to enable communications with a computing or communications network or other computing systems. In various illustrative implementations, any type of networking configuration may be achieved using communications adapter 516, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 500 in response to the processor 504 executing an implementation of instructions contained in main memory 506. Such instructions can be read into main memory 506 from another computer-readable medium, such as the storage device 510. Execution of the implementation of instructions contained in main memory 506 causes the computing system 500 to perform the illustrative processes described herein. One or more processors in a multi-processing implementation may also be employed to execute the instructions contained in main memory 506. In alternative implementations, hard-wired circuitry may be used in place of or in combination with software instructions to implement illustrative implementations. Thus, implementations are not limited to any specific combination of hardware circuitry and software.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAs, GPUS, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, for example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. A system for automatic labeling, comprising:
a camera; and
a controller comprising one or more processors coupled to one or more memories, the controller configured to:
acquire an image of a sample object via the camera,
receive, from a graphical user interface, an input from a user defining a location of a virtual token positioned over the image of the sample object, and
store a location of the virtual token as a target label location at which a label is to be applied to the sample object.

2. The system of claim 1, wherein:
the target label location is stored as a location that is relative to a corner of the sample object.

3. The system of claim 1, wherein:
the controller is further configured to:
    determine a suitability score for recognition of the sample object based on the image with and without the virtual token positioned over the image.

4. The system of claim 1, further comprising:
a robotic arm configured to apply labels to objects, wherein:
the controller is further configured to:
    detect a location and an orientation of an object in a stream of objects, and
    cause the robotic arm to apply a label to the object based on the detected location and orientation and the target label location.

5. The system of claim 4, wherein:
the controller is further configured to:
    cause the robotic arm to move in a horizontal direction based on the detected location and orientation and the target label location, and
    subsequently cause the robotic arm to move in a vertical direction based on the detected location and orientation and the target label location to apply the label to the object.

6. The system of claim 4, wherein:
the controller is further configured to reject a second object of the stream of objects based on an orientation of the second object.

7. The system of claim 5, wherein:
the controller is further configured to verify the label was correctly applied to the object.

8. The system of claim 5, further comprising:
a plate configured to receive printed labels from a printer, wherein:
the controller is further configured to:
    cause the robotic arm to retrieve the label from the plate prior to applying the label to the object.

9. The system of claim 2, wherein:
the controller is further configured to:
    determine one or more dimensions of the sample object, and
    navigate the robotic arm to avoid a collision with the object based on the one or more dimensions of the sample object.

10. The system of claim 9, wherein:
the one or more dimensions comprise a height of the sample object, and
the controller is further configured to navigate the robotic arm vertically based on the height of the sample object.

11. The system of claim 1, wherein: the camera is a three-dimensional (3D) camera.

12. The system of claim 1, wherein:
the controller is further configured to generate a code for the sample object.

13. The system of claim 1, wherein:
the controller is further configured to:
    identify a second token depicted in the image or positioned over the image of the sample object, and
    designate a location of the second token as an identifying information location that is identifiable to determine an orientation of the sample object.

14. The system of claim 13, wherein:
the second token is a second virtual token positioned over the image via input from the user to the graphical user interface.

15. The system of claim 13, further comprising:
a robotic arm configured to apply labels to objects, wherein:

the controller is further configured to:
    detect a location and an orientation of an object in a stream of objects based on the identifying information location, and
    cause the robotic arm to apply a label to the object based on the detected location and orientation and the target label location.

16. The system of claim 15, wherein:
the controller is further configured to:
    cause the robotic arm to move in a horizontal direction based on based on the detected location and orientation and the target label location, and
    subsequently cause the robotic arm to move in a vertical direction based on the detected location and orientation and the target label location to apply the label to the object.

17. The system of claim 15, wherein:
the controller is further configured to reject a second object of the stream of objects based on an orientation of the second object.

18. A method of using an automatic labeling system, the method comprising:
    acquiring an image of a sample object;
    receiving, from a graphical user interface, an input from a user defining a location of a virtual token positioned over the image of the sample object;
    identifying the virtual token positioned over the image of the sample object; and
    storing a location of the virtual token as a target label location at which a label is to be applied to the sample object.

19. The method of claim 18, further comprising:
    identifying a second token depicted in the image or positioned over the image of the sample object; and
    designating a location of the second token as an identifying information location that is identifiable to determine an orientation of the sample object.

20. The system of claim 1, wherein:
the target label location is stored as a location that is relative to a location of known identifying information on the sample object or a border of the sample object.

21. The system of claim 14, wherein:
the controller is configured to extract pixels designated by the second virtual token and utilize information in the pixels to train a model to detect an orientation of an object.

22. The system of claim 1, wherein:
the controller is further configured to:
    generate a candidate location for a second virtual token as an identifying information location that is identifiable to determine an orientation of the sample object,
    display, on the graphical user interface, the second virtual token positioned in the candidate location over the image of the sample object,
    receive, from the graphical user interface, a user input from the user to adjust the location of the second virtual token,
    receive, from the graphical user interface, an input from the user accepting the adjusted located of the second virtual token, and
    designate the adjusted location of the second virtual token as the identifying information location that is identifiable to determine the orientation of the sample object.

23. A system for automatic labeling, comprising:

a camera; and a controller comprising one or more processors coupled to one or more memories, the controller configured to:

acquire an image of a sample object via the camera, generate a candidate location for a virtual token as a target label location at which a label is to be applied to the sample object, display, on the graphical user interface, the virtual token positioned in the candidate location over the image of the sample object, receive, from the graphical user interface, a user input from the user to adjust the location of the virtual token, receive, from the graphical user interface, an input from the user accepting the adjusted location of the virtual token, and store the adjusted location of the virtual token as the target label location at which the label is to be applied to the sample object.

24. The system of claim 23, wherein:

the controller is further configured to, before receiving the input from the user accepting the adjusted location of the virtual token, receive, from the graphical user interface, an input from the user to adjust a size and/or a shape of the virtual token.

* * * * *